United States Patent
Matsumoto et al.

(10) Patent No.: US 9,383,597 B2
(45) Date of Patent: Jul. 5, 2016

(54) OPTICAL MODULATION CONTROL METHOD, CONTROL PROGRAM, CONTROL DEVICE, AND LASER LIGHT IRRADIATION DEVICE

(75) Inventors: Naoya Matsumoto, Hamamatsu (JP); Takashi Inoue, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/427,068

(22) PCT Filed: Sep. 13, 2012

(86) PCT No.: PCT/JP2012/073474
§ 371 (c)(1),
(2), (4) Date: Mar. 27, 2015

(87) PCT Pub. No.: WO2014/041660
PCT Pub. Date: Mar. 20, 2014

(65) Prior Publication Data
US 2015/0219937 A1    Aug. 6, 2015

(51) Int. Cl.
*G02F 1/01* (2006.01)
*G02B 26/08* (2006.01)
(Continued)

(52) U.S. Cl.
CPC ............ *G02F 1/0121* (2013.01); *B23K 26/026* (2013.01); *B23K 26/032* (2013.01);
(Continued)

(58) Field of Classification Search
USPC ......... 359/238, 285, 237, 251–253, 276, 278, 359/279, 283, 284, 286, 287, 290–292, 298
See application file for complete search history.

(56) References Cited

U.S. PATENT DOCUMENTS

2011/0193269 A1* 8/2011 Ito ..................... B23K 26/032
264/400
2015/0185523 A1* 7/2015 Matsumoto ........... G02F 1/1313
359/238

FOREIGN PATENT DOCUMENTS

JP    2001-272635 A   10/2001
JP       4300101 B2    7/2009
(Continued)

OTHER PUBLICATIONS

Jörgen Bengtsson, "Kinoform design with an optimal-rotation-angle method," Applied Optics, Oct. 10, 1994, pp. 6879-6884, vol. 33, No. 29.
(Continued)

*Primary Examiner* — Joseph P Martinez
*Assistant Examiner* — Brandi Thomas
(74) *Attorney, Agent, or Firm* — Drinker Biddle & Reath LLP

(57) ABSTRACT

In controlling light condensing irradiation with laser light using a spatial light modulator, an incident pattern of the laser light and respective refractive indices of first and second propagation media on a propagation path are acquired, the number of light condensing points, and the light condensing position and the light condensing intensity at each light condensing point are set, an aberration condition caused by the first and second propagation media is derived, and by taking the aberration condition into account, a modulation pattern to be presented in the spatial light modulator is designed. Further, in designing the modulation pattern, a design method focusing on an effect of a phase value at one pixel is used, and in evaluating the light condensing state at the light condensing point, a propagation function that takes the aberration condition into account is employed.

20 Claims, 12 Drawing Sheets

(51) Int. Cl.

| | | |
|---|---|---|
| *B23K 26/03* | (2006.01) | |
| *B23K 26/06* | (2014.01) | |
| *B23K 26/08* | (2014.01) | |
| *B23K 26/02* | (2014.01) | |
| *G02B 21/00* | (2006.01) | |
| *G02F 1/29* | (2006.01) | |
| *G02F 1/1362* | (2006.01) | |

(52) U.S. Cl.
CPC ............ *B23K26/035* (2015.10); *B23K 26/063* (2013.01); *B23K 26/0622* (2015.10); *B23K 26/0643* (2013.01); *B23K 26/0648* (2013.01); *B23K 26/0853* (2013.01); *G02B 21/0024* (2013.01); *G02F 1/292* (2013.01); *G02F 1/136277* (2013.01)

(56) References Cited

FOREIGN PATENT DOCUMENTS

| JP | 2010-058128 A | 3/2010 |
|---|---|---|
| JP | 2010-075997 A | 4/2010 |
| JP | 2011-180290 A | 9/2011 |
| JP | 2012-226268 A | 11/2012 |
| WO | WO-2009/063670 A1 | 5/2009 |

OTHER PUBLICATIONS

Jörgen Bengtsson, "Design of fan-out kinoforms in the entire scalar diffraction regime with an optimal-rotation-angle method," Applied Optics, Nov. 10, 1997, pp. 8435-8444, vol. 36, No. 32.

Nobukazu Yoshikawa et al., "Phase optimization of a kinoform by simulated annealing," Applied Optics, Feb. 10, 1994, pp. 863-868, vol. 33, No. 5.

N. Yoshikawa et al., "Quantized phase optimization of two-dimensional Fourier kinoforms by a genetic algorithm," Optics Letters, Apr. 1, 1995, pp. 752-754, vol. 20, No. 7.

C. Mauclair et al., "Ultrafast laser writing of homogeneous longitudinal waveguides in glasses using dynamic wavefront correction," Optic Express, Apr. 14, 2008, pp. 5481-5492, vol. 16, No. 8.

Alexander Jesacher et al., "Parallel direct laser writing in three dimensions with spatially dependent aberration correction," Optics Express, Sep. 27, 2010, pp. 21090-21099, vol. 18, No. 20.

H. Kubota, "Optics," Iwanami Shoten, Publishers, 1967, pp. 128-131, including partial English translation.

H. Kubota, "Optics," Iwanami Shoten, Publishers, 1967, pp. 300-301, including partial English translation.

Yusuke Ogura et al., "Wavelength-multiplexing diffractive phase elements: design, fabrication, and performance evaluation," Journal of Optical Society of America, May 2001, pp. 1082-1092, vol. 18, No. 5.

Naoya Matsumoto et al., "High-quality generation of a multispot pattern using a spatial light modulator with adaptive feedback," Optics Letters, Aug. 1, 2012, pp. 3135-3137, vol. 37, No. 15.

International Preliminary Report on Patentability dated Mar. 17, 2015 for PCT/JP2012/073474.

* cited by examiner

OPTICAL MODULATION CONTROL METHOD, CONTROL PROGRAM, CONTROL DEVICE, AND LASER LIGHT IRRADIATION DEVICE

TECHNICAL FIELD

The present invention relates to a light modulation control method, a control program, and a control device which control light condensing irradiation onto a light condensing point with laser light by a modulation pattern to be presented in a plurality of pixels of a spatial light modulator, and a laser light irradiation device using the same.

BACKGROUND ART

In recent years, intensive studies have been made on how to manufacture three-dimensional optical integrated circuits of a waveguide, an optical branching circuit, a directional coupler, and the like inside glass. Those methods for manufacturing such optical integrated circuits may include one that employs femtosecond laser light. For example, this method induces an impact at the light condensing point of the femtosecond laser light due to the two-photon absorption or the like, whereby the refractive index of the glass can be locally changed. Further, such light condensing irradiation of laser light onto an irradiation object has been widely employed not only for manufacturing the optical integrated circuit but also for various laser processing devices or laser microscopes by which scattering and reflection of laser light are observed (for example, refer to Patent Documents 1 to 3, Non-Patent Documents 1 to 6).

Here, in the case where one laser light beam emitted from a laser light source may be used for laser light irradiation to process a complicated three-dimensional structure, etc., this processing step would require an enormous amount of time. To reduce the processing time for this case, it can be thought to employ a plurality of light condensing points for multispot simultaneous processing. The simplest configuration for achieving such a method is to employ a plurality of laser light beams that are supplied from a plurality of laser light sources. However, such a configuration is not realistic when costs for preparing and space for mounting a plurality of laser light sources are taken into consideration.

In contrast to this, studies have been made for a method for achieving the multispot simultaneous processing using a phase-modulation type spatial light modulator (SLM: Spatial Light Modulator) and a hologram (CGH: Computer Generated Hologram) determined by numerical calculation. When laser light is input to the spatial light modulator with a CGH presented therein, the phase of the input light is modulated depending on the modulation pattern of the CGH. Then, when the wavefront of the modulated laser light output from the light modulator is condensed by the Fourier transform lens, it is possible to produce a plurality of light condensing points from one laser light beam, thereby enabling laser operations such as simultaneous processing and simultaneous observations by a multispot simultaneous irradiation.

In the multispot simultaneous processing inside an irradiation object (a processing object) using the spatial light modulator, it is possible to condense laser light at any position in one plane perpendicular to the optical axis. Further, in such multispot simultaneous processing, for example, a method may be employed in which a Fresnel lens pattern having the lens effect is presented in the spatial light modulator, thereby enabling the laser light to be condensed at an arbitrary three-dimensional position including the direction of the optical axis.

CITATION LIST

Patent Literature

Patent Document 1: Japanese Patent Application Laid-Open No. 2010-058128
Patent Document 2: Japanese Patent Application Laid-Open No. 2010-075997
Patent Document 3: Japanese Patent Publication No, 4300101

Non Patent Literature

Non-Patent Document 1: J. Bengtsson, "Kinoform design with an optimal-rotation-angle method," Appl. Opt, Vol. 33 No. 29 (1994) pp. 6879-6884
Non-Patent Document 2: J. Bengtsson, "Design of fan-out kinoforms in the entire scalar diffraction regime with an optimal-rotation-angle method," Appl. Opt. Vol. 36 No. 32 (1997) pp. 8435-8444
Non-Patent Document 3: N. Yoshikawa et al., "Phase optimization of a kinoform by simulated annealing," Appl. Opt. Vol. 33 No. 5 (1994) pp. 863-868
Non-Patent Document 4: N. Yoshikawa et al., "Quantized phase optimization of two-dimensional Fourier kinoforms by a genetic algorithm," Opt. Lett. Vol. 20 No. 7 (1995) pp. 752-754
Non-Patent Document 5: C. Mauclair et al., "Ultrafast laser writing of homogeneous longitudinal waveguides in glasses using dynamic wavefront correction," Opt. Exp. Vol. 16 No. 8 (2008) pp. 5481-5492
Non-Patent Document 6: A. Jesacher et al., "Parallel direct laser writing in three dimensions with spatially dependent aberration correction," Opt. Exp. Vol. 18 No. 20 (2010) pp. 21090-21099
Non-Patent Document 7: H. Kubota, "Optics," Iwanami Shoten, Publishers, (1967) pp. 128 to 131 and pp. 300 to 301
Non-Patent Document 8: Y. Ogura et al., "Wavelength-multiplexing diffractive phase elements: design, fabrication, and performance evaluation," J. Opt. Soc. Am. A Vol. 18 No. 5 (2001) pp. 1082-1092

SUMMARY OF INVENTION

Technical Problem

In above-described light condensing irradiation onto an irradiation object with laser light, with an aberration object present on the propagation path of the laser light from the spatial light modulator to the irradiation object, the laser light being propagated therethrough will be subject to an effect of aberration. For example, to process the inside of glass by irradiation with the laser light, the converging light output from an objective lens may lead to a focal position deviation (aberration) due to the difference in refractive index between the air of the ambient medium and the glass medium of the processing object.

Such aberration causes the shape of the light condensing point of the laser light to be elongated in the direction of the optical axis and the light condensing density to be reduced at the light condensing point. In this case, in processing the object, the intensity of the incident laser light has to be increased in order to allow the laser light intensity at the light condensing point to reach the processing threshold value, or microfabrication may be disabled because the light condensing shape is elongated. Such a problem with an effect of aberration may be likewise caused not only in the multispot simultaneous irradiation but also in the light condensing irradiation onto a single light condensing point with laser light.

The present invention has been achieved in order to solve the above-described problem, and an object thereof is to provide a light modulation control method, a light modulation control program, and a light modulation control device, which are capable of preferably controlling the light condensing state of laser light at a light condensing point, and a laser light irradiation device using the same.

Solution to Problem

In order to achieve such an object, a light modulation control method according to the present invention is (1) a light modulation control method by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, and the method includes (2) an irradiation condition acquiring step of acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) a light condensing condition setting step of setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) an aberration condition deriving step of deriving an aberration condition that is caused by the first propagation medium and the second propagation medium, which have refractive indices different from each other, in the propagation of the laser light from the spatial light modulator to the light condensing point s; and (5) a modulation pattern designing step of designing the modulation pattern to be presented in the spatial light modulator by taking into account the aberration condition derived in the aberration condition deriving step, and (6) in the modulation pattern designing step, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

Further, a light modulation control program according to the present invention is (1) a program allowing a computer to execute light modulation control by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, and the program allows the computer to execute (2) irradiation condition acquiring processing for acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) light condensing condition setting processing for setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) aberration condition deriving processing for deriving an aberration condition that is caused by the first propagation medium and the second propagation medium, which have refractive indices different from each other, in the propagation of the laser light from the spatial light modulator to the light condensing point s; and (5) modulation pattern designing processing for designing the modulation pattern to be presented in the spatial light modulator by taking into account the aberration condition derived in the aberration condition deriving processing, and (6) in the modulation pattern designing processing, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

Further, a light modulation control device according to the present invention is (1) a light modulation control device by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, and the device includes (2) irradiation condition acquiring means acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) light condensing condition setting means setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) aberration condition deriving means deriving an aberration condition that is caused by the first propagation medium and the second propagation medium, which have refractive indices different from each other, in the propagation of the laser light from the spatial light modulator to the light condensing point s; and (5) modulation pattern designing means designing the modulation pattern to be presented in the spatial light modulator by taking into account the aberration condition derived in the aberration condition deriving means, and (6) in the modulation pattern designing means, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

In the above-described light modulation control method, control program, and control device, for the light condensing irradiation onto a light condensing point with laser light using the spatial light modulator, information relating to the incident pattern of the laser light and the first and second propagation media on a propagation path is acquired, while light condensing conditions are set which include the number of light condensing points of the laser light, and the light condensing position and the light condensing intensity at each light condensing point. Then, derived is the aberration condition that is caused by the first and second propagation media, which have different refractive indices, being present on a propagation path, and the modulation pattern to be presented in the spatial light modulator is designed by taking the aberration condition into account. This allows for reducing an effect of aberration by the first and second propagation media on the set single or plurality of light condensing points in the light condensing state of the laser light at each light condensing point.

Further, for the design of a modulation pattern in such a configuration, a pixel structure of a plurality of two-dimensionally arrayed pixels is specifically assumed in the spatial light modulator. Then, such a design method is employed which focuses on an effect by a change in the phase value at one pixel of the modulation pattern on the light condensing state of the laser light at the light condensing point, and in evaluating the light condensing state at the light condensing point, the wave propagation function $\phi_{js}$ based on the assumption of free propagation is not employed, but the wave propagation function is converted into a propagation function $\phi_{js}'$ by taking the aberration condition into account in order to evaluate the light condensing state. According to such a configuration, it is possible to evaluate and control the light condensing state of the laser light at the light condensing point preferably and reliably. Note that in the case where a spatial light modulator having a plurality of two-dimensionally arrayed pixels is employed as the spatial light modulator, the pixel structure thereof can be directly applied to the design of the modulation pattern.

A laser light irradiation device according to the present invention includes (a) a laser light source supplying laser light; (b) a phase-modulation type spatial light modulator inputting the laser light thereto, modulating the phase of the laser light, and outputting the modulated laser light which is phase-modulated; and (c) the light modulation control device, configured as described above, controlling the light condensing irradiation onto the set light condensing point with the modulated laser light by the modulation pattern to be presented in the spatial light modulator.

Such a configuration allows the light modulation control device to control the light condensing state of the laser light at the light condensing point preferably and reliably, whereby the light condensing irradiation on a single or a plurality of light condensing points that are set in an irradiation object with the laser light can be preferably achieved, and the operation such as processing and observation of the object can also be thereby preferably achieved. Such a laser light irradiation device can be used, for example, as a laser processing device or a laser microscope. Note that the spatial light modulator to be used may be preferably configured as a spatial light modulator having a plurality of two-dimensionally arrayed pixels and modulating the phase of the laser light at the respective ones of the plurality of pixels.

Advantageous Effects of Invention

In accordance with the light modulation control method, the control program, the control device of the present invention, and the laser light irradiation device using the same, for the light condensing irradiation onto a light condensing point with laser light using a spatial light modulator, the incident pattern of the laser light and the refractive indices of the first and second propagation media on a propagation path are acquired, and the number of light condensing points of the laser light, and the light condensing position and the light condensing intensity at each light condensing point are set so as to derive an aberration condition caused by the first and second propagation media, and by taking the aberration condition into account, a modulation pattern to be presented in the spatial light modulator is designed, while for the design of the modulation pattern, such a design method is employed which focuses on an effect by a change in the phase value at one pixel of the modulation pattern on the light condensing state of the laser light at the light condensing point, and further, in evaluating the light condensing state at the light condensing point, a propagation function that takes the aberration condition into account is used, thereby it is possible to control, preferably and reliably, the light condensing state of the laser light at the light condensing point.

DESCRIPTION OF EMBODIMENTS

Figure 1:
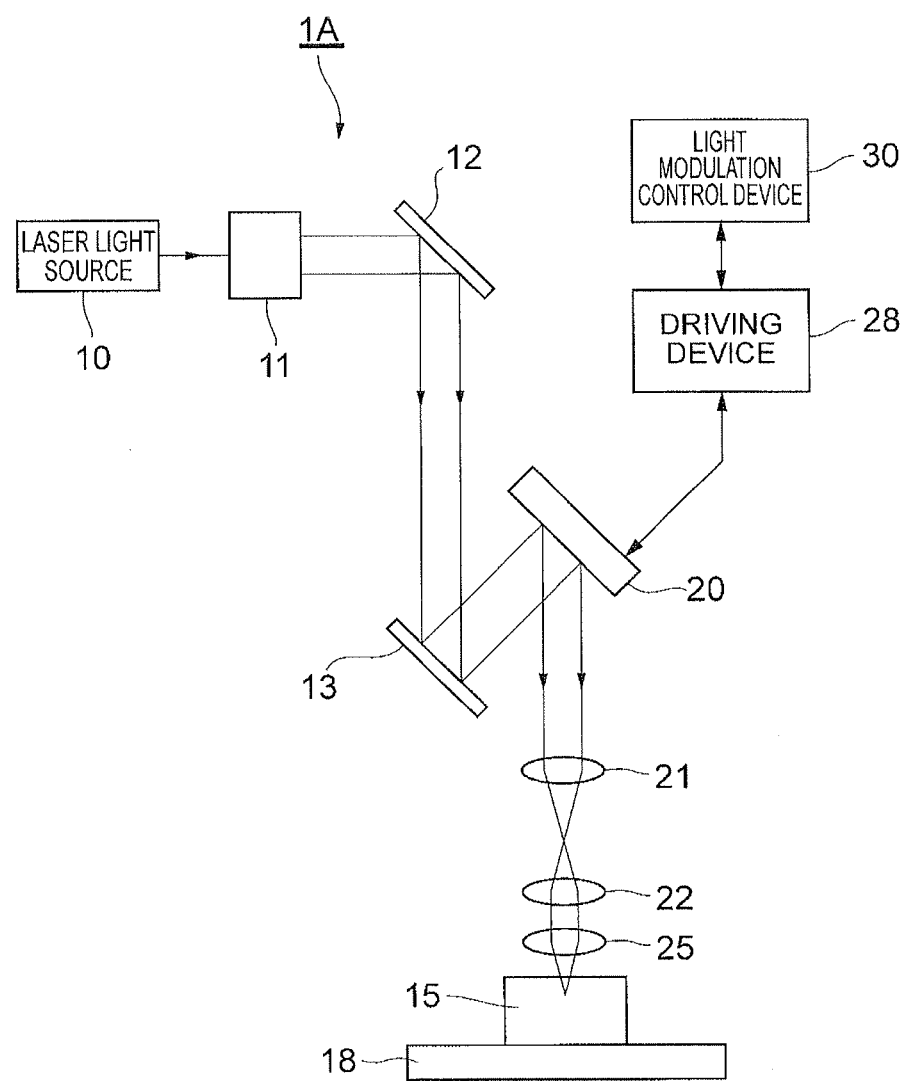
FIG. 1 is a diagram showing a configuration of an embodiment of a laser light irradiation device.

Hereinafter, an embodiment of a light modulation control method, a control program, a control device, and a laser light irradiation device according to the present invention will be described in detail with reference to the accompanying drawings. In addition, in the description of the drawings, the same components are denoted by the same reference symbols, and overlapping descriptions thereof will be omitted. Further, the dimensional ratios in the drawings are not necessarily equal to those in the descriptions.

First, description will be made for the basic configuration of a laser light irradiation device including a spatial light modulator, which is to be subject to the light modulation control according to the present invention, in conjunction with a configuration example thereof. FIG. 1 is a diagram showing a configuration of a laser light irradiation device of an embodiment including a light modulation control device according to the present invention. The laser light irradiation device 1A of the present embodiment, which carries out light condensing irradiation on an irradiation object 15 with laser light, includes a laser light source 10, a spatial light modulator 20, and a movable stage 18.

In the configuration shown in FIG. 1, the irradiation object 15 is placed on the movable stage 18 which is configured to be movable in the X direction, the Y direction (horizontal directions), and the Z direction (vertical direction). Further, the device 1A is configured to set a light condensing point, inside the irradiation object 15, for performing processing and observation of the object 15, etc.; so as to perform light condensing irradiation on the light condensing point with laser light.

The laser light source 10 supplies laser light such as pulsed laser light for light condensing irradiation for the irradiation object 15 on the stage 18. The laser light output from the laser light source 10 is expanded by a beam expander 11, and thereafter, input to the spatial light modulator (SLM) 20 via the reflecting mirrors 12 and 13.

The spatial light modulator 20 is a phase-modulation type spatial light modulator, and, for example, modulates a phase of laser light at each portion on its two-dimensional modulation plane, to output a phase-modulated laser light. As the spatial light modulator 20, preferably, a spatial light modulator having a plurality of two-dimensionally arrayed pixels, that modulates a phase of the laser light at each of the plurality of pixels is used. In such a configuration, a modulation pattern such as a CGH, for example, is to be presented in the spatial light modulator 20, and light condensing irradiation of the laser light onto a set light condensing point is controlled by this modulation pattern. Further, the spatial light modulator 20 is drive-controlled by a light modulation control device 30 via a light modulator driving device 28. The specific configuration, etc., of the light modulation control device 30 will be described later. Further, as the spatial light modulator 20, a spatial light modulator without the above-described pixel structure may be used.

The spatial light modulator 20 may be a reflective type, or a transmissive type. In FIG. 1, a reflective type is shown as the spatial light modulator 20. Further, as the spatial light modulator 20, a refractive-index changing material type SLM (for example, as an SLM using a liquid crystal, an LCOS (Liquid Crystal on Silicon) type, an LCD (Liquid Crystal Display)), a Segment Mirror type SLM, a Continuous Deformable Mirror type SLM, or a DOE (Diffractive Optical Element), or the like is exemplified. In addition, as a DOE, a DOE whose phase is discretely expressed, or a DOE that a pattern is designed by use of a method which will be described later, to convert it into a continuous pattern by smoothing or the like is included.

The laser light that is phase-modulated into a predetermined pattern in the spatial light modulator 20 and then output is propagated to an objective lens 25 through a 4f optical system that is composed of lenses 21 and 22. Then, the objective lens 25 allows the light condensing irradiation onto a single or a plurality of light condensing points, which are set on the surface or inside the irradiation object 15, with the laser light.

Note that the configuration of the optical system in the laser light irradiation device 1A is not specifically limited to the one shown in FIG. 1, and various configurations may be used. For example, the configuration of FIG. 1 is configured to expand the laser light with the beam expander 11, however, the combination of a spatial filter and a collimator lens may also be employed. Further, the driving device 28 may also be configured to be integrated with the spatial light modulator 20. Further, as the 4f optical system of the lenses 21 and 22, it is, in general, preferable to employ a both-sided telecentric optical system that is composed of a plurality of lenses.

Further, concerning the movable stage 18 for moving the irradiation object 15, for example, this stage may be made fixed while the optical system side may be provided with a movable mechanism, a Galvano mirror, or the like. Further, as the laser light source 10, for example, it is preferable to employ a pulsed laser light source, for supplying pulsed laser light, such as a Nd:YAG laser light source or a femtosecond laser light source.

Figure 2:
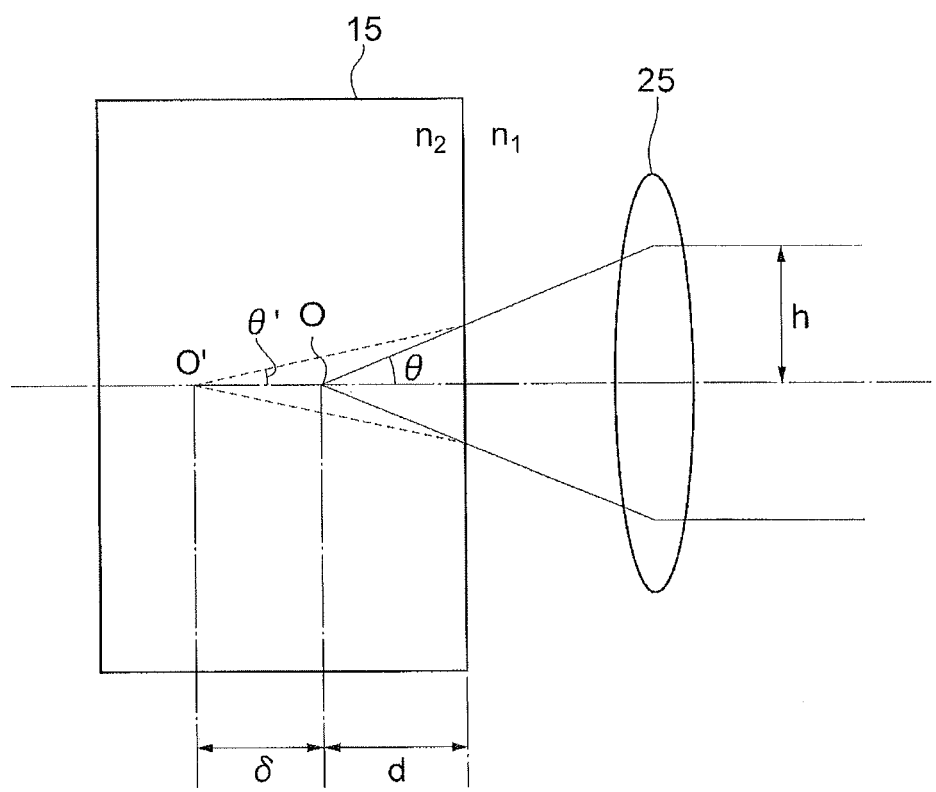
FIG. 2 is a diagram showing how aberration occurs in the propagation process of laser light.

In the laser light irradiation device 1A shown in FIG. 1, when an aberration object is present on the propagation path of laser light from the spatial light modulator 20 to a light condensing point inside the irradiation object 15, the laser light is subject to an effect of aberration in the process of propagation. Here, FIG. 2 shows how aberration occurs in the propagation process of the laser light. For example, when a light condensing point is set inside the irradiation object 15 as described above, the converging laser light output from the objective lens 25 experiences the difference between the refractive index $n_1$ of air of an ambient medium (first propagation medium) on the propagation path from the objective lens 25 to the light condensing point and the refractive index $n_2$ of the irradiation object (second propagation medium) 15 such as a glass medium, and this difference causes the paraxial light beam and the outermost light beam to have different angles of refraction on the boundary surface between the ambient medium and the irradiation object 15 such as a glass medium, thereby causing a focal deviation (spherical aberration).

For example, as shown in FIG. 2, suppose that a focus O of the objective lens 25 is located at a depth d inside the irradiation object 15. In this case, the focus O is deviated to a focus O' by the amount of focal deviation δ due to the angle of refraction on the boundary surface between the air of the refractive index $n_1$ and the object 15 of the refractive index $n_2$. Further, the amount of focal deviation δ varies depending on the incident height h of light incident on the objective lens 25. Such spherical aberration resulting from the focal deviation δ depending on the incident height h causes the shape of the light condensing point of the laser light to be elongated in the direction of the optical axis in the object 15 and the light condensing density to be reduced.

Further, the occurrence of aberration due to the propagation media becomes problematic even when a plurality of light condensing points are set inside the irradiation object 15, and the object 15 is subject to multispot simultaneous irradiation (for example, multispot simultaneous processing). That is, the above-described spherical aberration has a tendency that the amount of aberration differs depending on the light condensing position (depth along the optical axis) in the direction of the optical axis of the laser light, so that the greater the optical axis depth, the greater the amount of spherical aberration becomes. In this case, to perform three-dimensional multispot simultaneous irradiation on the object 15, it is necessary to correct different amounts of spherical aberration depending on the depth along the optical axis at the respective light condensing positions for each light condensing point.

Further, in the case of performing the multispot simultaneous irradiation, there is also a problem with the adjustment of the light condensing intensity of the laser light for each light condensing point. For example, in the processing of the interior of glass using the femtosecond laser light, it is known that the amount of change in refractive index caused by the processing in a target portion differs depending on the light condensing intensity of the laser light at the light condensing point. Thus, when the multispot simultaneous irradiation of the laser light is used to manufacture at a time a plurality of waveguides that have an equivalent refractive index distribution, with the modulation pattern to be presented in the spatial light modulator, it is desirable to reconstruct the light condensing intensities at the plurality of light condensing points with high uniformity. On the other hand, it is also possible to manufacture a plurality of waveguides having different refractive index distributions by setting the light condensing intensities at a plurality of light condensing points to mutually different intensities. In all of these cases, it is desirable that when a plurality of light condensing points are set, the light condensing intensity of the laser light at each light condensing point can be controlled arbitrarily.

In contrast to this, the laser light irradiation device 1A of FIG. 1 is configured such that the CGH of the modulation pattern to be presented in the spatial light modulator 20 via the driving device 28 is appropriately designed in the light modulation control device 30, whereby an effect of aberration resulting from propagation media of different refractive indices on the propagation path is reduced so as to preferably control the light condensing state of the laser light at the light condensing point. Further, the laser light irradiation device 1A and the light modulation control device 30 according to the present embodiment are configured such that when a plurality of light condensing points are set, the three-dimensional multispot laser light irradiation and the adjustment of the light condensing intensity between the light condensing points can also be preferably achieved.

Figure 3:
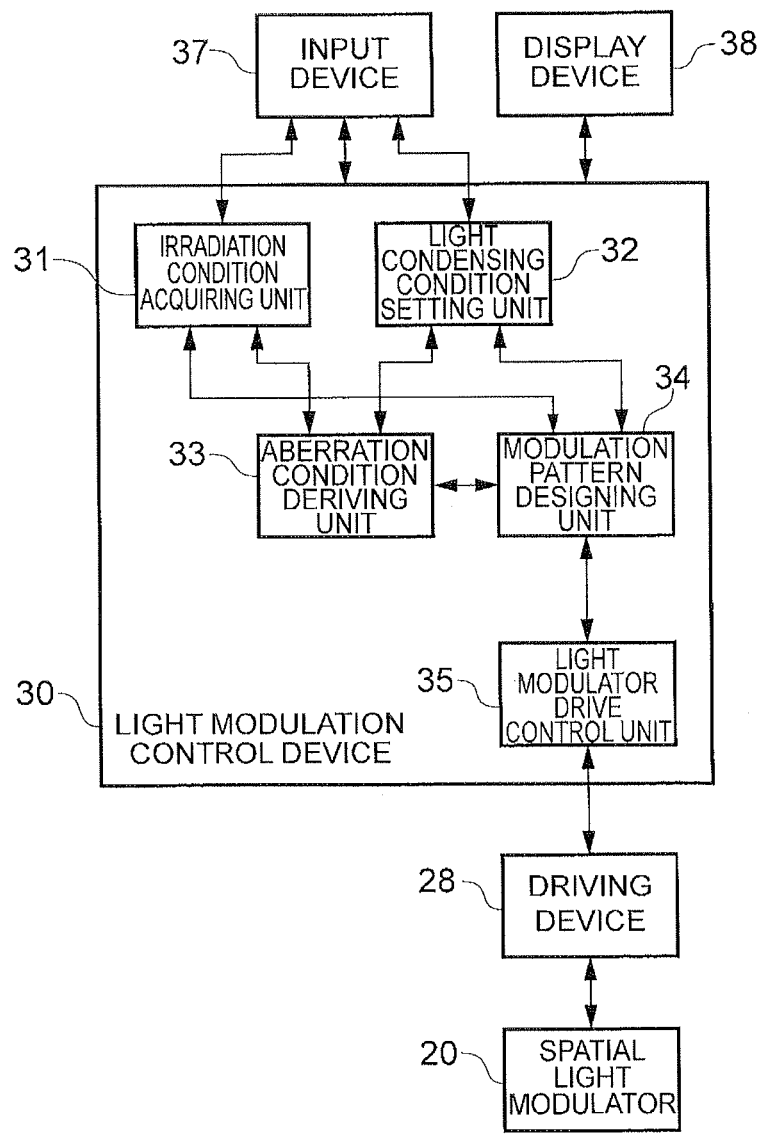
FIG. 3 is a block diagram showing an example of a configuration of a light modulation control device.

FIG. 3 is a block diagram showing an example of a configuration of the light modulation control device 30 which is applied to the laser light irradiation device 1A shown in FIG. 1. The light modulation control device 30 according to the present configuration example includes an irradiation condition acquiring unit 31, a light condensing condition setting unit 32, an aberration condition deriving unit 33, a modulation pattern designing unit 34, and a light modulator drive control unit 35. In addition, such a light modulation control device 30 may be composed of, for example, a computer. Further, an input device 37 used for inputting information, instructions, and the like necessary for light modulation control, and a display device 38 used for displaying information for an operator are connected to this control device 30.

The irradiation condition acquiring unit 31 is irradiation condition acquiring means for acquiring information relating to an irradiation condition on the irradiation object 15 with laser light. More specifically, the irradiation condition acquiring unit 31 acquires, as an irradiation condition of the laser light, the incident pattern of the laser light to the spatial light modulator 20 (e.g., the intensity distribution and the phase distribution information), the first refractive index $n_1$ of a first propagation medium (e.g., an ambient medium) present on the propagation path of the laser light from the light modulator 20 to the light condensing point, and the second refractive index $n_2$ of a second propagation medium located to be closer to the light condensing point side than the first propagation medium, the second refractive index being different from the first refractive index (an irradiation condition acquiring step).

The light condensing condition setting unit 32 is light condensing condition setting means for setting light condensing conditions of the laser light for the irradiation object 15. More specifically, the light condensing condition setting unit 32 sets, as a light condensing condition of the laser light, the number $s_t$ of light condensing points that are subject to the light condensing irradiation with the modulated laser light from the spatial light modulator 20, and the light condensing position and the light condensing intensity at the respective $s_t$ light condensing points s (s=1 to $s_t$) (a light condensing condition setting step). The number $s_t$ of light condensing points is set to an integer of 1 or more, and for the multispot simultaneous irradiation, set to an integer of 2 or more. Note that the acquisition of the irradiation condition by the acquiring unit 31 and the setting of the light condensing condition by the setting unit 32 are carried out automatically or manually by the operator, e.g., on the basis of information that is prepared in advance in the control device 30, information input from the input device 37, or information supplied from an external device.

The aberration condition deriving unit 33 is aberration condition deriving means for deriving an aberration condition relating to the aberration that occurs on a propagation path along which laser light propagates from the spatial light modulator 20 to the light condensing point s that is set for the irradiation object 15. Here, as described above in relation to FIG. 2, the aberration condition deriving unit 33 derives the aberration condition that occurs due to the first propagation medium on the optical system side and the second propagation medium on the light condensing point side, the propagation media being located on the propagation path of the laser light and having mutually different refractive indices (an aberration condition deriving step). Further, if there are three or more propagation media on the propagation path, the aberration condition deriving unit 33 derives the aberration condition that results from all of those propagation media.

The modulation pattern designing unit 34 is modulation pattern designing means for designing a CGH of a modulation pattern to be presented in the spatial light modulator 20, by taking into account the aberration condition on the propagation path derived in the aberration condition deriving unit 33. More specifically, the modulation pattern designing unit 34 refers to the irradiation condition acquired by the acquiring unit 31, the light condensing condition set by the setting unit 32, and the aberration condition derived in the deriving unit 33, and then designs, on the basis of those conditions, the modulation pattern which allows the light condensing irradiation onto a desired single or a plurality of light condensing points with the laser light (a modulation pattern designing step).

In particular, in the modulation pattern designing unit 34 in the present embodiment, in the design of a modulation pattern to be presented in the spatial light modulator 20, a design method in which a plurality of two-dimensionally arrayed pixels in the spatial light modulator 20 is assumed, and which focuses on an effect on a light condensing state of the laser light on the light condensing point by changing a phase value of one pixel (corresponding to one pixel assumed in the spatial light modulator 20, and in the case where the spatial light modulator 20 has a pixel structure composed of a plurality of two-dimensionally arrayed pixels, one pixel thereof) in a modulation pattern to be presented in the plurality of pixels is used. Then, the phase value of the one pixel is changed so as to bring its light condensing state closer to a desired state, and such phase value changing operations are performed for all the pixels (at least all the pixels to which the light is incident) in the modulation pattern, thereby designing an optimum modulation pattern.

Further, when the light condensing state of the laser light at the light condensing point is evaluated in the above-described operation of changing the phase value at each pixel, the modulation pattern designing unit 34 employs, for the propagation of light from a pixel j in the modulation pattern of the spatial light modulator 20 to the light condensing point s, not the wave propagation function $\phi_{js}$ as it is, which is based on the assumption of free propagation through a homogeneous propagation medium, but the propagation function $\phi_{js}'$ which is converted from the propagation function $\phi_{js}$ by adding thereto the aberration condition determined by the aberration condition deriving unit 33. This allows the light condensing state of the laser light to be controlled by taking into account the aberration condition on the propagation path.

The light modulator drive control unit 35 is drive control means for drive-controlling the spatial light modulator 20 via the driving device 28, to present the modulation pattern designed by the modulation pattern designing unit 34 to the plurality of pixels in the spatial light modulator 20. Such a drive control unit 35 is provided as necessary in the case where the light modulation control device 30 is included in the laser light irradiation device 1A.

It is possible to achieve processing corresponding to the control method executed in the light modulation control device 30 shown in FIG. 3 by a light modulation control program for causing a computer to execute light modulation control. For example, the light modulation control device 30 may be composed of a CPU for operating the respective software programs necessary for the processing of light modulation control, a ROM in which the above-described software programs and the like are stored, and a RAM in which data is temporarily stored during program execution. In such a configuration, by executing a predetermined control program by the CPU, it is possible to achieve the light modulation control device 30 described above.

Further, the above-described program for causing the CPU to execute light modulation control by use of the spatial light modulator 20, in particular, each processing for designing a modulation pattern to be presented in the spatial light modulator 20, may be recorded in a computer readable recording medium, so as to be distributed. As such a recording medium, for example, a magnetic medium such as a hard disk or a flexible disk, an optical medium such as a CD-ROM or a DVD-ROM, a magnetooptic medium such as a floptical disk, or a hardware device such as a RAM, a ROM, and a semiconductor nonvolatile memory, which are specially arranged so as to execute or store program instructions, and the like, are included.

The effects of the light modulation control method, the light modulation control program, the light modulation control device 30, and the laser light irradiation device 1A according to the present embodiment will be described.

The light modulation control method, the control program, and the control device 30 shown in FIG. 1 to FIG. 3 are configured such that for the light condensing irradiation onto the light condensing point with laser light using the spatial light modulator 20, the information including the incident pattern of the laser light and the refractive index for the first and second propagation media on the propagation path is acquired, while the light condensing conditions including the number $s_t$ of the light condensing points of the laser light, and the light condensing position and the light condensing intensity at each light condensing point are set. Then, the aberration condition deriving unit 33 derives the aberration condition that is caused by the presence of the first and second propagation media having different refractive indices on the propagation path of the laser light, and by taking the aberration condition into account, the modulation pattern designing unit 34 designs the modulation pattern to be presented in the spatial light modulator 20. For a single or a plurality of light condensing points set by the light condensing condition setting unit 32, it is thus possible to reduce an effect of aberration by the first and second propagation media in the light condensing state of the laser light at each light condensing point.

Further, for the design of a modulation pattern in such a configuration, a pixel structure of a plurality of two-dimensionally arrayed pixels is specifically assumed in the spatial light modulator 20. Then, such a design method is employed which focuses on an effect by a change in the phase value at one pixel of the modulation pattern on the light condensing state of the laser light at the light condensing point, and in evaluating the light condensing state at the light condensing point, the wave propagation function $\phi_{js}$ based on the assumption of free propagation through a homogeneous propagation medium is not employed, but the wave propagation function is converted into a propagation function $\phi_{js}'$ by taking the aberration condition into account in order to evaluate the light condensing state. According to such a configuration, it is possible to evaluate and control the light condensing state of the laser light at the light condensing point preferably and reliably.

Note that concerning the pixel structure to be assumed in the spatial light modulator 20, when a spatial light modulator having a plurality of two-dimensionally arrayed pixels is employed as the spatial light modulator 20, the pixel structure thereof can be directly applied to the design of a modulation pattern. It is also to be understood here that the free propagation may include not only the propagation through a vacuum or atmosphere, but also, in general, as described above, the propagation through a homogeneous propagation medium, for example, the propagation through only in the presence of a homogeneous first propagation medium in the absence of the second propagation medium.

Further, the laser light irradiation device 1A shown in FIG. 1 is composed of the laser light source 10, the phase-modulation type spatial light modulator 20, and the light modulation control device 30 configured as described above. Such a configuration allows the control device 30 to preferably and reliably control the light condensing state of the laser light at the light condensing point, thereby making it possible to preferably achieve the light condensing irradiation of the laser light on a single or a plurality of light condensing points set in the irradiation object 15, and the operation such as processing and observation of the object can be thereby also preferably achieved. Further, such a laser light irradiation device can be used, for example, as a laser processing device or a laser microscope, etc.

Here, in deriving the aberration condition in the deriving unit 33, consider the propagation of light from the pixel j in the plurality of pixels of the spatial light modulator 20 to the set light condensing point s, and in this case, as the aberration condition for the propagation of the light, it is preferable to determine a phase $\Phi_{j\text{-}OPD}$ that shows an optical path difference OPD during the propagation. Further, in this case, in the design of the modulation pattern in the designing unit 34, using the phase $\phi_{j\text{-}OPD}$ of the aberration condition derived as described above, it is preferable to determine the propagation function $\phi_{js}'$ that takes into account the aberration condition by the following conversion formula.

$$\phi_{js}' = \phi_{js} + \Phi_{j\text{-}OPD}$$

According to such a configuration, the propagation function $\phi_{js}$ for free propagation can be preferably converted into the propagation function $\phi_{js}'$ that takes the aberration condition into account.

Further, in the design of the modulation pattern in the designing unit 34, it is preferable to determine a complex amplitude $U_s$ indicating the light condensing state at the light condensing point s by the following formula, $$U_s = A_s \exp(i\phi_s)$$
$$= \Sigma_j A_{j\text{-}in} \exp(i\phi_{js}') \exp(i(\phi_j + \phi_{j\text{-}in}))$$

where $A_{j\text{-}in}$ is the incident amplitude of the laser light on the pixel j of the spatial light modulator 20, and is the phase value at the pixel j. Or, it is more preferable to determine the complex amplitude $U_s$ indicating the light condensing state at the light condensing point s by the following formula, $$U_s = A_s \exp(i\phi_s)$$
$$= \Sigma_j A_{j\text{-}in} \exp(i\phi_{js}') \exp(i\phi_j)$$

where $A_{j\text{-}in}$ is the incident amplitude of the laser light on the pixel j of the spatial light modulator 20, $\phi_{j\text{-}in}$ is the incident phase, and $\phi_j$ is the phase value of the pixel j. This makes it possible to preferably evaluate the light condensing state of the laser light at the light condensing point.

Here, the incident amplitude of the laser light on the pixel j is related to the incident intensity $I_{j\text{-}in}$ as follows.

$$I_{j\text{-}in} = |A_{j\text{-}in}|^2$$

Further, in the complex amplitude $U_s$, $A_s$ is the amplitude and $\phi_s$ is the phase. Further, for the incident laser light being a plane wave, the incident phase $\phi_{j\text{-}in}$ can be disregarded.

As to the specific configuration for the design of the modulation pattern, in changing the phase value at the pixel j of the modulation pattern, the phase value may be changed by a value analytically determined on the basis of the phase $\phi_s$ of the complex amplitude indicating the light condensing state at the light condensing point s, the propagation function $\phi_{js}'$ that takes the aberration condition into account, and the phase value $\phi_j$ before being changed at the pixel j. Such methods for updating the phase value in an analytical manner may include, for example, an ORA (Optimal Rotation Angle) method.

Or, in changing the phase value at the pixel j of the modulation pattern, the phase value may be changed by a value determined by a search using any method of a hill-climbing method, a simulated annealing method, and a genetic algorithm. Here, in the genetic algorithm, operations such as a mutation that a certain pixel is selected to change its pixel value, and a crossover that two pixels are selected to exchange their pixel values are performed, and the above-described design method focusing on an effect on a light condensing state of laser light at a light condensing point by changing the phase value of one pixel in the modulation pattern includes a method of performing such operations. In addition, the modulation pattern design method will be described in detail later.

As to the first and second propagation media having different refractive indices present on the propagation path of laser light, in the configuration shown in FIG. 2, for example, the second propagation medium on the light condensing point side is the irradiation object 15 in which the light condensing point is set, and the first propagation medium on the optical system side is an ambient medium present between the spatial light modulator 20 and the irradiation object 15 (between the objective lens 25 and the object 15). In this case, the ambient medium may also be water, oil, or the like, other than air.

Further, there may also be three or more media on the propagation path between the spatial light modulator and the light condensing point. Such configuration may include, for example, one in which laser light passes through a medium having a refractive index that is different from that of the ambient medium, and then after having passed therethrough, the laser light is condensed. Further, various configurations that are conceivable for the medium on the propagation path of the laser light may include, for example, one in which multiple types of glass having different refractive indices are affixed to each other, one in which glass is affixed on silicon, or one in which a cover glass is present on the propagation path in observation of the inside of a biological sample or cell by a microscope, etc. Such a configuration may also be conceivable which enables simultaneous light condensing irradiation on a plurality of media with laser light. Even in such a case, it is also possible to derive the aberration condition and design the modulation pattern in the same manner as described above.

Further, in the light modulation control device 30 shown in FIG. 3, in addition to the configuration for designing a modulation pattern, the light modulator drive control unit 35 which drive-controls the spatial light modulator 20, and presents a modulation pattern designed by the designing unit 34 to the spatial light modulator 20 is provided. Such a configuration is effective in the case where the control device 30 is used in a manner incorporated in the laser light irradiation device 1A as shown in FIG. 1. Further, such a drive control unit 35 may also be provided as a separate device from the light modulation control device 30.

Further, for example, in the case where a glass medium is processed by laser light irradiation to prepare an optical integrated circuit, one or a plurality of new CGHs may be designed after one or a plurality of laser light irradiations, to switch a modulation pattern to be presented in the spatial light modulator 20. Or, when the shape of the optical integrated circuit that one wants to manufacture has been determined, a plurality of modulation patterns required for laser processing may be designed in advance.

Further, to singly use a DOE, a driving device may be eliminated because the DOE has a static pattern. Further, to dynamically switch between patterns using a plurality of DOEs, a switching device is employed in place of the driving device.

Figure 4:
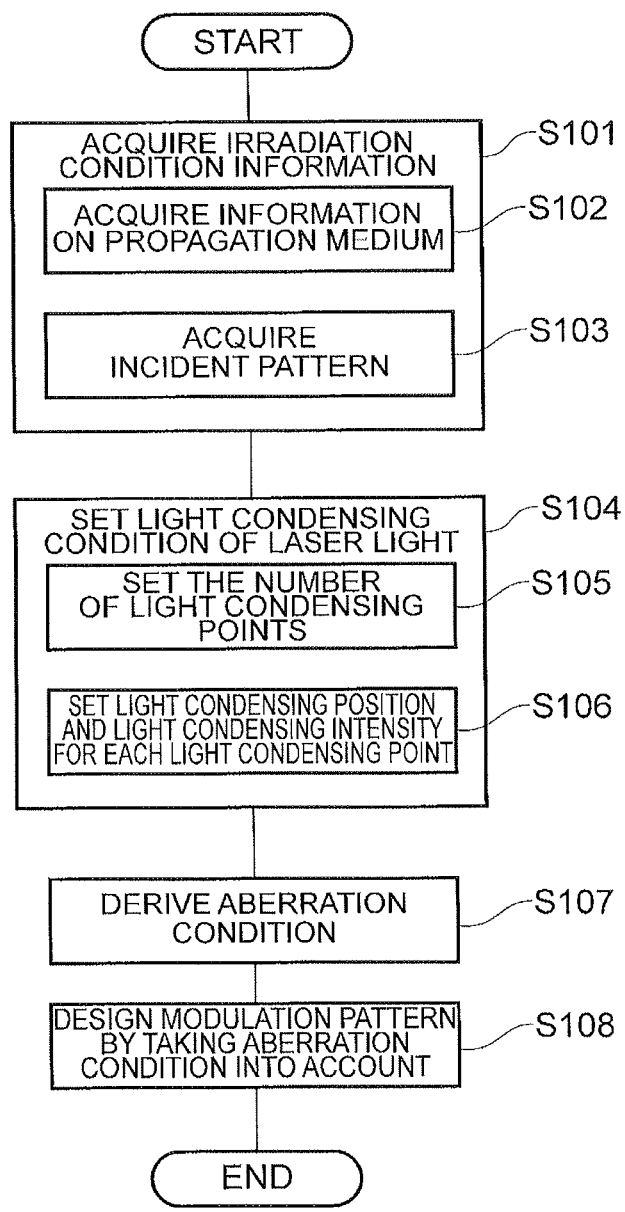
FIG. 4 is a flowchart showing an example of a light modulation control method.

The light modulation control method and the modulation pattern design method executed in the laser light irradiation device 1A and the light modulation control device 30 shown in FIG. 1 and FIG. 3 will be further described along with their specific examples. FIG. 4 is a flowchart showing an example of the light modulation control method executed in the light modulation control device 30 shown in FIG. 3.

In the control method shown in FIG. 4, first, information on the condition of irradiating the irradiation object 15 with laser light supplied from the laser light source 10 is acquired (step S101). More specifically, concerning the propagation path of the laser light from the spatial light modulator 20 to the light condensing point s, the first refractive index $n_1$ of the first propagation medium (e.g., the ambient medium) present on the propagation path, and the second refractive index $n_2$ of the second propagation medium (e.g., the irradiation object) are acquired (S102). Further, here, if required, information other than the refractive indices of the first and second propagation media is also acquired, for example, information on the thickness, shape, and position, etc., of the media. Further, in addition to the information on the propagation media, the process may also acquire any information required to derive the aberration condition, for example, the NA of the objective lens 25, the focal length f, and the like, other than the information on the propagation media.

Further, an incident pattern of the laser light supplied from the laser light source 10 to the spatial light modulator 20 is acquired (S103). The incident pattern of the laser light is given as the incident light intensity distribution defined by the incident laser light intensity, $$I_{in}(x_j, y_j) = I_{j\text{-}in}$$

for the pixel j at the position $(x_j, y_j)$ of a plurality of two-dimensionally arrayed pixels in the spatial light modulator 20. Or, the incident pattern of the laser light may be acquired as the incident light amplitude distribution by the amplitude $A_{j\text{-}in}$. Further, if required, the incident phase $\phi_{j\text{-}in}$ of the laser light may also be acquired.

Next, light condensing conditions of the laser light on the irradiation object 15 are set (S104). First, the number of one or a plurality of light condensing points $s_t$ at which light condensing irradiation of the laser light phase-modulated in the spatial light modulator 20 is performed on the irradiation object 15 is set (S105). Here, in the laser light irradiation device 1A according to the above-described configuration, it is possible to obtain a plurality of light condensing points as necessary according to a modulation pattern to be presented in the spatial light modulator 20.

Further, for each of the $s_t$ light condensing points s=1 to $s_t$ in the object 15, the light condensing position $\gamma_s = (u_s, v_s, z_s)$ and the desired light condensing intensity $I_{s\text{-}des}$ of the laser light are set (S106). Note that the light condensing intensity of the laser light onto each light condensing point may not always have to be set by the absolute value of the intensity but may also be set, for example, by the relative ratio of the intensity.

Subsequently, the aberration condition that is caused by the first and second propagation media having different refractive indices during the propagation of the laser light from the spatial light modulator 20 to the light condensing point s is derived (S107). Then, by taking into account the aberration condition derived in step S107, the process refers to the irradiation condition and the light condensing condition for the laser light that are acquired and set in steps S101 and S104, and designs the CGH that is the modulation pattern to be presented in the plurality of pixels of the spatial light modulator 20 (S108).

The method for deriving the aberration condition that is executed in step S107 in the flowchart of FIG. 4 will be more specifically described. When the spatial light modulator 20 is replaced by a mirror in the configuration shown in FIG. 1, the laser light supplied from the laser light source 10 is not phase-modulated, and thus, ideally, parallel light is incident on the objective lens 25 and then converted into a spherical wave by the objective lens 25. In the absence of an aberration object on the propagation path (light condensing path) of the laser light, the light from the objective lens 25 is condensed to one point at the condensing depth that is equal to the focal length f.

On the one hand, in the presence of the first and second propagation media having different refractive indices on the propagation path, a change in angle of refraction causes aberration to occur, so that the light from the objective lens 25 is not condensed to one point. In contrast to this, when the modulation pattern to be presented in the spatial light modulator 20 is appropriately designed and the wavefront of the light propagating to the objective lens 25 is deformed, the laser light can be condensed with no effect of aberration for the set light condensing point s.

In deriving a wavefront for condensing the laser light at a desired light condensing point, for example, it is possible to employ a method for deriving the wavefront by reverse ray tracing from a desired light condensing position. In the description below, shown by way of example is a method of deriving a wavefront for condensing light, with no effect of aberration, at a light condensing point present on the optical axis inside a parallel planar substrate (see Patent Document 2). Note that to derive the wavefront and the aberration condition resulting therefrom (e.g., the phase $\Phi_{j\text{-}OPD}$ indicating the aberration condition to be described later), it is possible to employ various specific methods such as an optimization correction method (Non-Patent Document 5) or a method for analyzing aberration in a paraxial light beam (Non-Patent Document 7), etc., other than the reverse ray tracing method.

Figure 5:
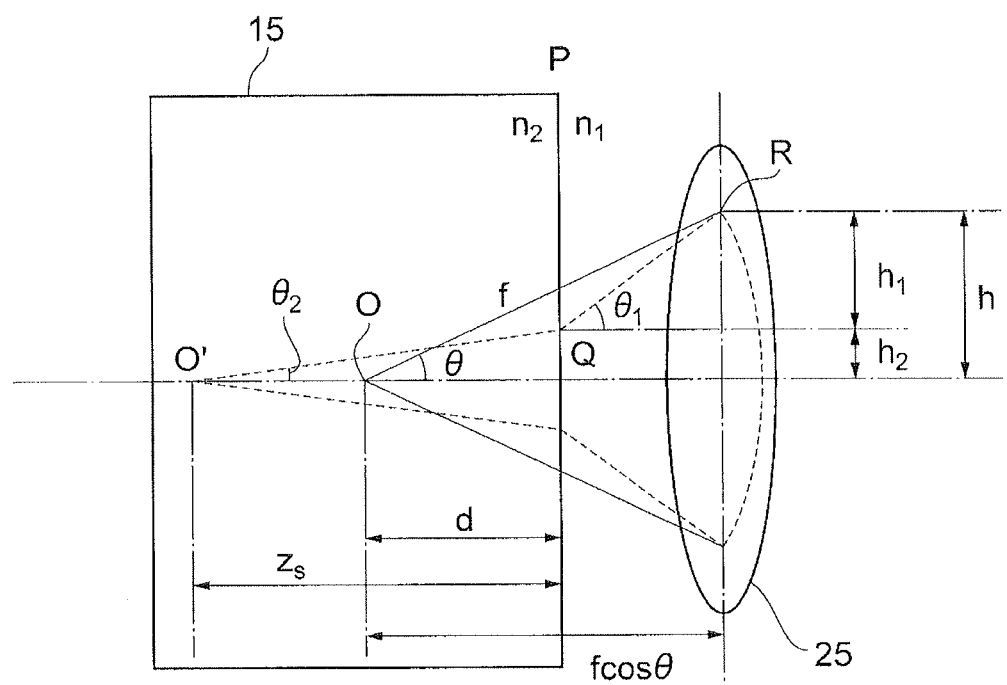
FIG. 5 is a diagram showing how to derive an aberration condition that is caused in the propagation of laser light.

FIG. 5 is a diagram showing how to derive the aberration condition that is caused by the propagation of laser light. First, consider the case where the refractive index $n_1$ of the ambient medium and the refractive index $n_2$ of the irradiation object 15 are equal to each other. When the objective lens 25 is moved by a distance d toward the object 15 side with respect to a reference position of the objective lens 25 at which the light is condensed at a position on an end face P of the object 15, the light is condensed at a point O that is spaced apart from the end face P by the distance d. The ideal incident plane wave light becomes a spherical wave immediately after being converted by the objective lens 25, and the light beam from a point R on the spherical wave reaches the point O by taking the optical path shown by the solid line in FIG. 5. At this time, the optical path length from the point R to the point O is f and remains the same irrespective of the optical axis height.

On the one hand, when the refractive indices $n_1$ and $n_2$ are different, the light from the objective lens 25 is not condensed at the point O. In this context, with the objective lens 25 being moved by the same amount of the distance d, the wavefront of the laser light is modulated by the spatial light modulator 20, thereby allowing the light to be condensed at the point O' that is spaced apart from the end face P by $z_s$. In this case, the light beam from the point O' reaches the point R through a point Q on the boundary surface between the object 15 and the ambient medium, so that the total of O'Q and QR is the optical path length. Such an optical path length (OPL: Optical Path Length) is derived for each optical axis height h.

First, as shown in FIG. 5, letting θ be the incident angle of the light beam to the object 15 before the wavefront is corrected, $\theta_1$ be the incident angle of the light beam to the object 15 after the wavefront is corrected, and $\theta_2$ be the refraction angle, the optical axis heights $h_1$, $h_2$, and h are respectively expressed by the following formulas (1), (2), and (3).

[Formula 1]

$$h_1 = (f\cos\theta - d)\tan\theta_1 \qquad (1)$$

[Formula 2]

$$h_2 = z_s \tan\theta_2 \qquad (2)$$

[Formula 3]

$$h = n_1 f \sin\theta \qquad (3)$$

Here, the incident angle $\theta_1$ and the refraction angle $\theta_2$ can be uniquely related to each other by Snell's law. Further, the relational formula $h=h_1+h_2$ and the above formulas (1) to (3) uniquely relate the angles θ, $\theta_1$, and $\theta_2$ to each other. For example, when a specific $\theta_1$ or $\theta_2$ is given, the above formulas (1) and (2) can be substituted into the relational formula $h=h_1+h_2$ to solve the formula (3), thereby determining θ with ease.

However, conversely, when a specific θ is given, it is difficult to analytically determine $\theta_1$ and $\theta_2$. To determine $\theta_1$ and $\theta_2$ corresponding to the specific angle θ, a search is performed. For example, while the value of $\theta_1$ or $\theta_2$ is changed gradually, the value of θ is determined at each step. Then, until $\theta_1$ and $\theta_2$ that give the desired value of θ are obtained, $\theta_1$ or $\theta_2$ is changed, by performing a search and deriving the angle.

As described above, by the formulas (1) to (3), $\theta_1$ and $\theta_2$ corresponding to the desired θ are determined. Then, for each incident angle θ, the optical path length OPL of the propagation of light caused by the irradiation object 15 is determined by the following formula (4).

[Formula 4]

$$OPL(\theta, d, z_s) = \frac{n_1 \times (f \times \cos\theta - d)}{\cos\theta_1} + \frac{n_2 \times z_s}{\cos\theta_2} - f - (n_2 - n_1) \times d \qquad (4)$$

Here, the term "$-f-(n_2-n_1)\times d$" in the formula (4) is a constant term, and is added to prevent the value of the OPL from being excessively increased.

The above formula (4) expresses the optical path length for each incident angle θ, however, from the formula (3) and the formula (4), the optical path length for each optical axis height h can also be expressed as the following formula (5).

[Formula 5]

$$OPL(h, d, z_s) = \frac{n_1 \times \left(f \times \cos\left(\sin^{-1}\left(\frac{h}{n_1 f}\right)\right) - d\right)}{\cos\theta_1} + \frac{n_2 \times z_s}{\cos\theta_2} - f - (n_2 - n_1) \times d \qquad (5)$$

This makes it possible to determine the OPL corresponding to the optical axis height h.

When the phase $\Phi_{OPD}$ that gives a difference in OPL, i.e., the optical path difference (OPD: Optical Path Difference) is given by the spatial light modulator (SLM) 20, thereby allowing the laser light to be condensed at a desired position inside the object 15. The phase $\Phi_{OPD}$ can be determined from the formula (5) as follows.

[Formula 6]

$$\Phi_{OPD}(h,d,z_s) = \{OPL(h,d,z_s) - OPL(0,d,z_s)\} \times 2\pi/\lambda \qquad (6)$$

This phase $\Phi_{OPD}$ is derived for each $z_s$ with the distance d fixed for three-dimensional multispot irradiation. Here, the range of the optical axis height h is 0 to $h_{max}$. Further, $h_{max}$ ranges from 0 to NA×f, that is, the aperture of the objective lens 25 is the maximum of $h_{max}$ of the optical axis height.

Further, the above-described optical axis height h and the position ($x_j$, $y_j$) of the pixel j of the SLM 20 are related to each other as follows. When the SLM 20 and the objective lens 25 form an image by the 4f optical system as the optical system shown in FIG. 1, the wavefront of the pupil of the objective lens is propagated to the SLM. At this time, letting the focal length of the lens 21 of the 4f optical system be f1, and the focal length of the lens 22 be f2, the lateral magnification M is expressed as M=f2/f1. Thus, the light from the exit pupil of the objective lens gives the optical axis height h=0 to $h_{max}$/M on the SLM.

Further, when the central position of the light from the exit pupil of the objective lens 25 is known to be at coordinates ($x_c$, $y_c$) on the SLM, the optical axis height h and the pixel coordinates ($x_j$, $y_j$) of the SLM can be converted by the following formula (7).

[Formula 7]

$$h = \sqrt{(x_j - x_c)^2 + (y_j - y_c)^2} \qquad (7)$$

This allows for determining the phase $\phi_{j\text{-}OPD}$ that is the aberration condition for each pixel j at the coordinates ($x_j$, $y_j$).

Next, description will be specifically made for a method for designing a modulation pattern to be executed in step S108 in the flowchart of FIG. 4. Hereinafter, description will be made for a design method using an ORA method as an example of a design method which focuses on an effect of the phase value at one pixel of the modulation pattern to be presented in the SLM 20 (see Patent Document 3, and Non-Patent Documents 1 and 2).

Here, in general, a plurality of design methods for a CGH used as a modulation pattern in the SLM are available and may include, for example, the iterative Fourier method. First, in the iterative Fourier transform method, two surfaces of the SLM surface and the diffraction surface are prepared, and then light is allowed to propagate between the respective surfaces by the Fourier transform and the inverse Fourier transform. Then, in this method, amplitude information on each surface is replaced at each time of propagation and finally the phase distribution is acquired.

Further, other CGH design methods may include two design methods, i.e., the ray tracing method and the design method that focuses on an effect of one pixel. The ray tracing method includes the method of superposition of lens (S method: Superposition of Lens). This method is effective when there is not much overlap of wavefronts from a light condensing point, but, an increase in overlap of wavefronts may cause the intensity of light propagating to a light condensing point among the intensity of laser light incident on the SLM to be considerably reduced or made uncontrollable. Thus, there is also available an iterative S method which is an improved version of the S method.

On the other hand, the design method focusing on an effect by one pixel in a CGH is a method of appropriately selecting one pixel in a CGH, and changing a phase value of each pixel, to perform designing the CGH, and there are a search type method and an analysis type method according to a method of determining a phase of one pixel.

In this design method, a phase value of a certain pixel in a CGH is changed as a parameter, and modulated laser light is propagated by use of a wave propagation function by the Fresnel diffraction or the like, to examine how values (for example, values of an amplitude, an intensity, and a complex amplitude) indicating a light condensing state at a desired light condensing point change. Then, a phase value by which the light condensing state on the light condensing point is brought closer to a desired result is adopted. Such an operation is performed on one pixel by one pixel on at least all the pixels to which light is incident.

After the operations are completed on all the pixels, in an analysis type method, after it is confirmed how a phase at a desired position changes based on the results of the phase-modulations of all the pixels, the process returns to the first pixel, to change a phase one pixel by one pixel by use of the phase at the desired position. Further, in a search type method, the process returns to the first pixel without performing confirmation. As a search type method, for example, there are a hill-climbing method, a simulated annealing method (SA: Simulated Annealing), and a genetic algorithm (GA: Genetic Algorithm), and the like (refer to Non-Patent Documents 3 and 4).

The ORA (Optimal Rotation Angle) method, to be described below, is an optimization algorithm that employs an analysis type method. In this method, the phase value of a modulation pattern at each pixel is changed and adjusted by a value analytically determined on the basis of the phase $\phi_s$ of a complex amplitude indicating the light condensing state at the light condensing point s, the phase $\phi_{js}$ of the propagation function, and the phase value $\phi_j$ at the pixel j given before being changed. Particularly, in place of the propagation function $\phi_{js}$, the design method according to the present embodiment employs the propagation function $\phi_{js}'$ that takes into account the aberration condition by the first and second propagation media.

Figure 6:
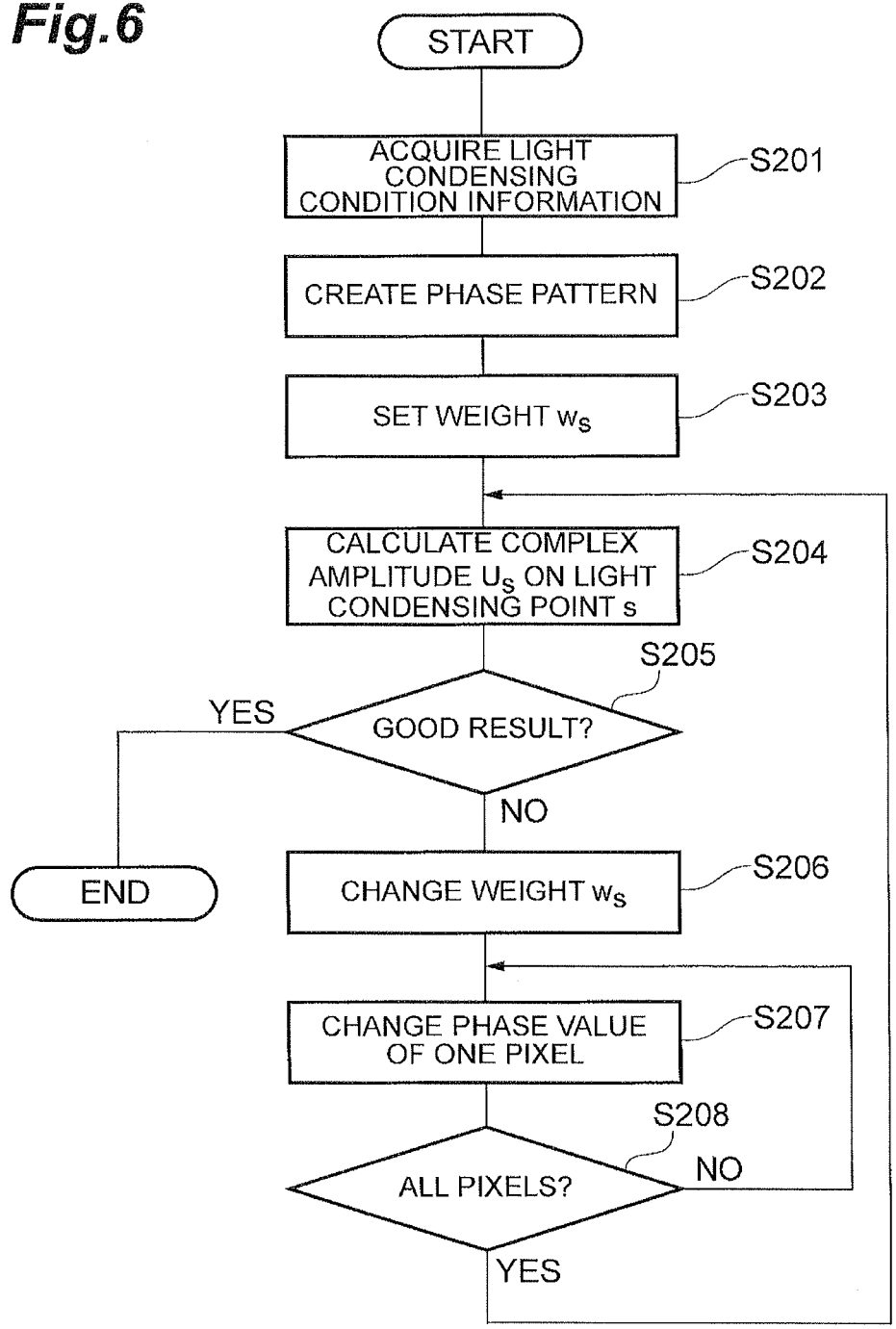
FIG. 6 is a flowchart showing an example of a method for designing a modulation pattern.

FIG. 6 is a flowchart showing an example of a method of designing a modulation pattern to be executed in the light modulation control device 30 shown in FIG. 3. First, information on set light condensing conditions for the light condensing irradiation onto the irradiation object 15 with laser light that is performed via the spatial light modulator 20 is acquired (step S201). As the light condensing conditions to be acquired here include the number $s_t$ of light condensing points, the light condensing position $\gamma_s=(u_s, v_s, z_s)$ of each light condensing point s, and a desired light condensing intensity $I_{s\text{-}des}$.

Next, a phase pattern serving as an initial condition for the design of a CGH used as a modulation pattern to be presented in the SLM 20 is created (S202). This phase pattern is created by, for example, a method in which a phase value $\phi_j$ of a pixel j in the CGH is made into a random phase pattern. Because the design of a CGH by an ORA is an optimization technique, this method is used for the purpose of prevention from leading to a specific minimum solution due to a random phase. In addition, in the case where the possibility of leading to a specific minimum solution can be disregarded, for example, it may be set to a uniform phase pattern or the like.

Subsequently, if the number of light condensing points is set to a plural number ($s_t \geq 2$), then a weight $w_s$ is set to $w_s=1$ as the initial condition, the weight $w_s$ being a parameter for adjusting the light condensing intensity ratio between the light condensing points s=1 to $s_t$ (S203). Here, the weight $w_s$ is a $1 \times s_t$ array. Further, when a single ($s_t=1$) light condensing point is present, it is not necessary to set the weight.

After having completed setting the phase pattern $\phi_j$ of the CGH and the weight $w_s$ the complex amplitude $U_s$ indicating the light condensing state of the laser light at the light condensing point s is calculated (S204). More specifically, the complex amplitude $U_s=A_s\exp(i\phi_s)$ is determined by the following formula (8), which expresses light wave propagation.

[Formula 8]

$$U_s = A_s\exp(i\phi_s) = \sum_j A_{j\text{-}in}\exp(i\phi'_{js})\exp(i(\phi_j + \phi_{j\text{-}in})) \quad (8)$$

Here, $A_{j\text{-}in}$ is the incident amplitude of the laser light on the pixel j of the SLM 20, and $\phi_j$ is the phase value at the pixel j. Further, $\phi_{j\text{-}in}$ is the phase of the laser light incident on the pixel j.

Further, in the formula (8), $\phi_{js}'$ is a propagation function that takes into account the aberration condition caused by the first and second propagation media (the ambient medium and the irradiation object 15 in the example shown in FIG. 5), and is determined as follows.

[Formula 9]

$$\phi_{js}'=\phi_{js}+\Phi_{j\text{-}OPD} \quad (9)$$

In the above formula (9), $\Phi_{j\text{-}OPD}$ is the phase of the aberration condition for the pixel j expressed in the formula (6).

As described above, by employing the propagation function $\phi_{js}'$ that takes the aberration condition into account, it is possible to obtain a CGH that can give a desired result even at any light condensing points that have different $z_s$. Further, $\phi_{js}$ is a propagation function in a finite distance region based on the assumption of free propagation. As the propagation function $\phi_{js}'$, it is possible to employ, for example, Fresnel diffraction of an approximation formula of the wave propagation function that is given by the following formula (10).

[Formula 10]

$$\phi_{js} = \frac{n_1 \times k}{2f}[(u_s - x_j)^2 + (v_s - y_j)^2] \quad (10)$$

Here, k is the wave number in the above-described formula (10).

In addition, it is possible to use various derived formulas as the propagation function $\phi_{js}$ for free propagation, for example, the Fresnel diffraction approximation formula described above, the Fraunhofer diffraction approximation formula, or a solution of the Helmholtz equation. Further, if the phase of the aberration condition is $\phi_{j\text{-}OPD}=0$ in the above formulas (8) and (9), then the propagation function is $\phi_{js}'=\phi_{js}$, providing the formula for calculating the complex amplitude which is employed in the conventional ORA method and takes no aberration into account.

Further, when the propagation function of the formula (10) is used to design the CGH by the ORA method, such a CGH is designed to which the lens effect of the focal length f of the objective lens is also added. However, in general, since the SLM has a large pixel size, the lens effect of the objective lens thereof cannot be expressed. Thus, in practice, used is not the focal length f but the value of focal length L (e.g., about L=1 m for LCOS-SLM X10468 made by Hamamatsu Photonics).

Subsequently, it is judged whether or not a desired result has been obtained in the design of the CGH by the above-described method (S205). As the judgment method for this case, for example, it is possible to employ a method in which the light condensing intensity $I_s=|A_s|^2$ obtained at each light condensing point s and the desired intensity $I_{s\text{-}des}$ are compared with each other by the following formula (11),

[Formula 11]

$$\max\left(\frac{I_{s\text{-}des}}{I_s}\right) \leq \varepsilon \tag{11}$$

so as to judge whether the intensity ratio is equal to or less than a predetermined value s at all light condensing points s. It is also acceptable to make a judgment based not on the light condensing intensity $I_s$ but, for example, on the amplitude $A_s$ or the complex amplitude $U_s$.

Or, in the flowchart of FIG. 6, a method in which it is judged by conditions of, such as, whether or not a specified number of loops of changing a phase value and calculating a complex amplitude, and the like are performed, may be used. In the case where it is judged that the designed CGH satisfies the necessary conditions with respect to the set light condensing conditions, the design algorithm for a CGH by an ORA is completed. Further, in the case where the conditions are not satisfied, the process proceeds to the following step S206.

If it is judged that conditions required to complete the design are not satisfied, the process first changes the value of the weight $w_s$ for adjusting the light condensing intensity ratio between the light condensing points s by the following formula (12) (S206).

[Formula 12]

$$w_s = w_s \left(\frac{I_{s\text{-}des}}{I_s}\right)^\eta \tag{12}$$

Here, the parameter η used in the formula (12) to update the weight $w_s$ is, usually, a value about η=0.25 to 0.35 customarily to prevent the ORA algorithm from becoming unstable.

Next, a phase value changing operation is performed for each pixel of the CGH such that the light condensing state of the laser light on the light condensing point s is brought closer to a desired state (S207). In the analysis type ORA method, the amount of phase change $\Delta\phi_j$ to be added to the phase value $\phi_j$ at the pixel j in order to bring the light condensing state closer to the desired state is analytically determined by the following formula (13),

[Formula 13]

$$\Delta\phi_j = \arctan\left(\frac{P_2}{P_1}\right) \tag{13}$$

and a judgment, using the phase $\phi_s$ of the complex amplitude obtained by the formula (8), the phase $\phi_{js}'$ of the propagation function that takes into account the aberration condition $\Phi_{j\text{-}OPD}$, and the phase value $\phi_j$ before being updated. Here, it holds as follows.

[Formula 14]

$$P_1 = \sum_s w_s A_{j\text{-}in} \cos\Phi_{js} \tag{14}$$

[Formula 15]

$$P_2 = \sum_s w_s A_{j\text{-}in} \sin\Phi_{js} \tag{15}$$

[Formula 16]

$$\Phi_{js} = \phi_s - (\phi_{js}' + \phi_j + \phi_{j\text{-}in}) = \phi_s - (\phi_{js} + \phi_j + \phi_{j\text{-}in} + \Phi_{j\text{-}OPD}) \tag{16}$$

A method of analytically determining a phase value $\phi_j$ in this way has an advantage that a time required for calculation is shortened as compared with a method such as the hill-climbing method which determines a phase value by a search.

Here, for $\Phi_{js}$ used to determine the amount of phase change $\Delta\phi_{js}$, the usual ORA method employs the following formula (17),

[Formula 17]

$$\Phi_{js}=\phi_s-(\phi_{js}+\phi_j+\phi_{j\text{-}in}) \tag{17}$$

however, in addition to a change in the above-described propagation function, the improved ORA method described here also employs the formula (16), which takes into account the phase $\Phi_{j\text{-}OPD}$ of the aberration condition, even in calculating this $\Phi_{js}$ in updating the phase value.

When the amount of phase change $\Delta\phi_j$ is determined as described above, the following formula (18)

[Formula 18]

$$\phi_j=\phi_j+\Delta\phi_j \tag{18}$$

is used to change and update the phase value $\phi_j$ of the CGH at the j-th pixel. Then, it is confirmed whether or not a phase value changing operation is performed on all the pixels (S208), and when the changing operation has not been completed, it is set to j=j+1, a phase value changing operation is performed on the next pixel. On the other hand, when the changing operation for all the pixels has been completed, the process returns to step S204, and a calculation of a complex amplitude $U_s$ and an evaluation of a light condensing state are carried out. Such operations are repeatedly executed, a CGH of a modulation pattern corresponding to the set light condensing conditions is thereby created.

As described above, the CGH designed by the above-described method is given the lens effect of the focal length f of the objective lens. Thus, in the case of using the objective lens of the focal length f, the following formula

[Formula 19]

$$\alpha_{j\text{-}res}'=\alpha_{j\text{-}res}-\phi_{obj} \tag{19}$$

may be applied to the phase value $\phi_{j\text{-}res}$ of the resulting CGH that is obtained as a result of the design by the ORA method. Here, it holds as follows.

[Formula 20]

$$\phi_{obj} = \frac{\pi((x_j-x_c)^2+(y_j-y_c)^2)}{\lambda f_{obj}} \tag{20}$$

Here, when the above-described focal length L is used in place of $f_{obj}$, the process changes $f_{obj}$ to L also in the formula (20).

Here, conventionally, to correct the aberration in the case of the presence of media having different refractive indices on the propagation path, a method has been used in which a pattern for aberration correction is determined, and the correction pattern is then added to the modulation pattern of the designed CGH (for example, see Non-Patent Document 5). Methods for deriving the correction pattern in this case may include, for example, the optimization correction method, an analysis method using the paraxial approximation, and an analysis method using the reverse ray tracing. The inverse phase of the aberration condition derived from these methods is a pattern for aberration correction. However, such a method that is based on the addition of patterns may not appropriately function as described below.

That is, a design method that focuses on an effect of one pixel of the CGH such as the above-described ORA method enables three-dimensional multispot irradiation by a plurality of light condensing points with laser light by one CGH. When the correction pattern is added to such a CGH as in the conventional manner, the effects of the same aberration correction pattern are given for all light condensing points that are reconstructed by the CGH. However, in practice, the plurality of light condensing points to be set may have different positions in the optical axis direction (optical axis depths). In this case, it is necessary to give the effects of aberration correction patterns that are different for each light condensing point because an effect of aberration differs depending on the optical axis depth. That is, the method for adding the correction pattern to the CGH can only make an aberration correction at a single optical axis depth, and thus there is a possibility for aberration to be insufficiently corrected at different optical axis depths.

Further, disclosed in Non-Patent Document 6 is a design method using the iterative Fourier method. In such a method, it is necessary to perform additional processing in the design of the CGH for three-dimensional multispot irradiation. To reconstruct the CGH designed by the usual iterative Fourier method, it is necessary to provide a lens at a subsequent stage of the SLM. This is because the propagation distance is infinite at the design stage and thus control cannot be provided for each optical axis depth (light condensing position in the optical axis direction).

In this method, to change the optical axis depth, it is necessary to separately add a Fresnel lens pattern to the CGH designed by the iterative Fourier method. Further, to achieve the three-dimensional multispot irradiation, first, by the iterative Fourier method, a CGH for each light condensing plane (diffraction plane) to which a light condensing point is set is determined, and then the phases of Fresnel lens patterns for providing control in the direction of depth are added to the respective CGHs. Subsequently, the CGHs of a plurality of light condensing planes are added to each other in the form of complex amplitude and only the phase is extracted, thereby designing the CGH for three-dimensional multispot irradiation.

Further, in adding the Fresnel lens pattern to the CGH for each light condensing plane, the aberration correction pattern for correcting an effect due to the medium on the propagation path is also added thereto, thereby making possible a spherical aberration correction for each light condensing plane. However, in such a method, since only the phase is extracted after the complex amplitude has been calculated, information on the amplitude distribution is lacking, making it extremely difficult to distribute the amplitude to each light condensing point.

In contrast to this, the above-described CGH design method can preferably achieve such an aberration correction and distribute an amplitude to each light condensing point. Further, in such a design method, for example, it is possible to design a CGH that achieves at the same time the following three operations: the correction of an effect by a medium present on the propagation path, the medium having a refractive index different from that of the ambient medium of air (or, water, oil, or the like); the three-dimensional multispot irradiation; and the adjustment of intensity among a plurality of light condensing points.

Figure 7:
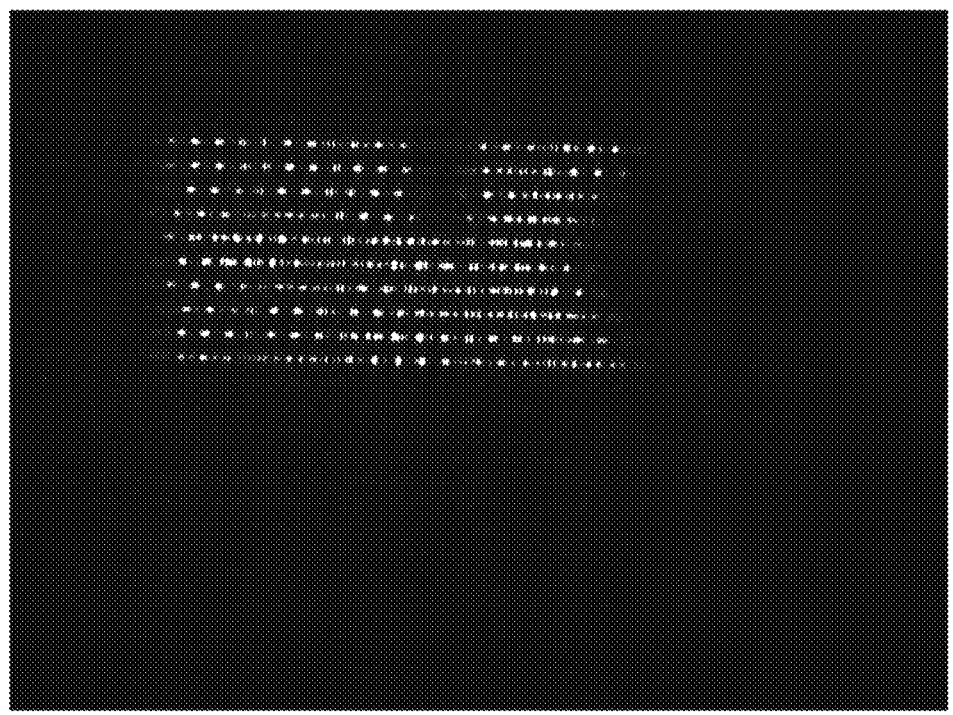
FIG. 7 is a diagram showing an example of an irradiation pattern of laser light by the laser light irradiation device.
Figure 8:
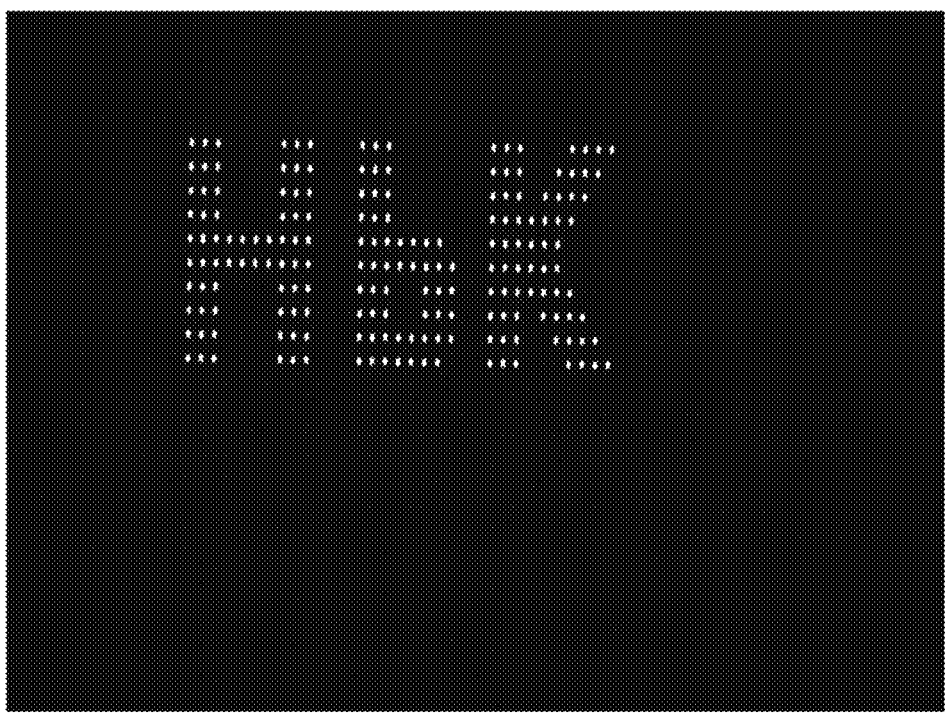
FIG. 8 is a diagram showing an example of an irradiation pattern of laser light by the laser light irradiation device.
Figure 9:
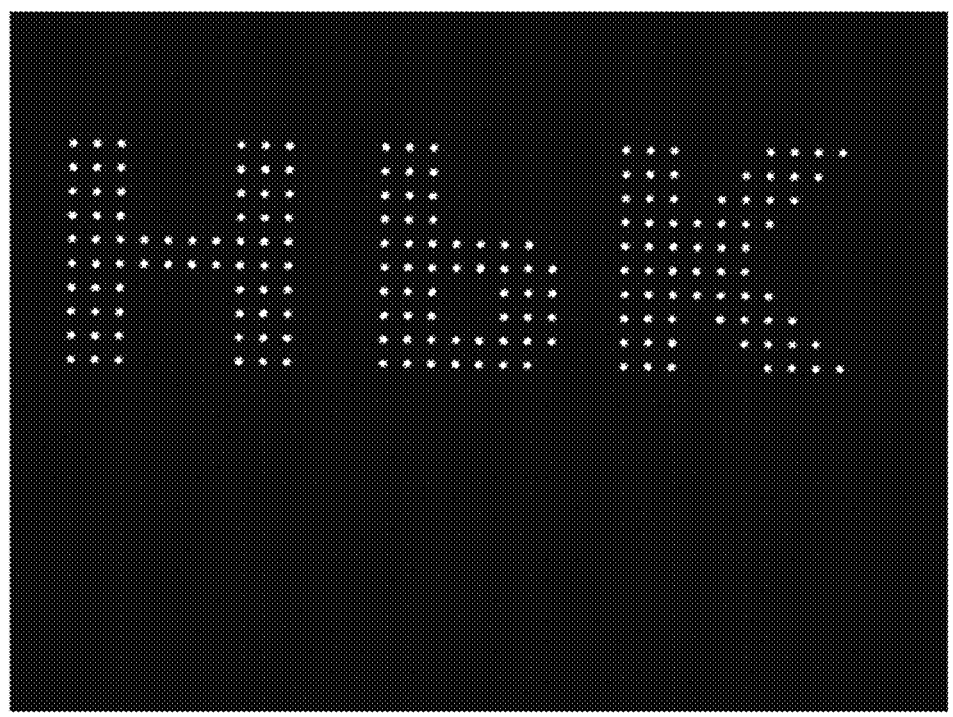
FIG. 9 is a diagram showing an example of an irradiation pattern of laser light by the laser light irradiation device.

Now, description will be made for the effects of, e.g., an aberration correction that are given by the light modulation control device 30 and the laser light irradiation device 1A according to the above-described embodiment in conjunction with specific examples thereof. FIG. 7 to FIG. 9 are diagrams each showing an example of an irradiation pattern of laser light provided by the laser light irradiation device 1A (an example of a reconstructed image of CGH). Here, the laser light is expanded by a spatial filter and then the light is phase-modulated by the LCOS-SLM of the spatial light modulator 20, so that the resulting light is condensed by a lens of f=800 mm. At this time, a cylindrical lens of f=200 mm is disposed at a position spaced apart by 700 mm from the condensing lens. In this example, the cylindrical lens is an aberration object that is inserted in the light condensing optical system.

Use of such a modulation pattern that does not make a correction on the aberration object would cause the CGH not to be presented correctly due to an effect of the aberration of the cylindrical lens as shown in FIG. 7. On the other hand, when the aberration object is corrected by the above-described CGH design method, an image with the aberration corrected can be observed at the position of $z_s$=850 mm from the condensing lens as shown in FIG. 8.

Note that the aberration correction for the cylindrical lens is slightly different in the method of deriving the OPD, etc., when compared with the case for the above-described parallel plane substrate. That is, for the parallel plane substrate, two-dimensional calculation can be used because of axial symmetry. In contrast, for the cylindrical lens or for the case where the object is tilted, it is necessary to follow an appropriate method corresponding thereto for deriving the OPD.

Further, in the above-described CGH design method, information such as the light condensing position including the optical axis depth, the refractive index, and the pixel pitch in the spatial light modulator is accurately available, and it is thus possible to perform, for example, light condensing irradiation and laser processing of a desired position with laser light. Here, FIG. 9 is a diagram showing the result of reconstructing a CGH in the absence of an object on the propagation path, the CGH reconstructing an "HPK" pattern designed by the usual iterative Fourier method. On the other hand, FIG. 8 is a diagram showing the result of reconstructing and presenting the sum of the CGH designed by the ORA method so as to condense light at a position (0, 0, $z_s$) on the optical axis and the CGH of the "HPK" pattern.

A comparison of FIG. 8 with FIG. 9 shows that the reconstruction positions in the horizontal direction of the drawings are different. The shapes of the light condensing points are good; however, the CGH used as the modulation pattern in FIG. 8 has not been subject to the correction for the diffraction in the horizontal direction in which the refraction by the cylindrical lens took place. In contrast to this, there are two methods described below for improving the diffraction in the horizontal diffraction as well.

That is, the first method derives the respective OPDs of reconstructed points one by one including the position in a plane perpendicular to the direction of the optical axis. In this case, since $\Phi_{j\text{-}OPD}$ includes the information on the position of the point s, $\phi_{js}$ is common to all points s and $\Phi_{j\text{-}OPD}$ is different at the position of each point.

The second method derives different OPDs depending on the optical axis depth without including the position in the plane perpendicular to the optical axis direction. In this case, since $\phi_{j\text{-}OPD}$ does not include the information on the position of the point s, $\phi_{js}$ adjusts the position in the plane perpendicular to the optical axis direction, that is, $\phi_{js}$ differs depending on the position of the respective points.

Here, when the latter method is applied, and as described above, not the actual focal length f but the focal length L is used, it is necessary to change $(u_s, v_s)$. Since the lens effects are finally removed even when f is used or L is used, there will be no problem if $(u_s, v_s)$ has been designed correctly. In this context, when the focal length L is used, the $(u_s', v_s')$ after having been changed is set so that $(u_s', v_s')=(\beta u_s, \beta v_s)$. Here, $\beta$ is a parameter for correcting for the change in the focal length of the lens, and becomes $\beta=L/f$ for a short distance between the optical axis and $(u_s, v_s)$.

These methods are used to design the CGH. By doing so, it is possible to reconstruct each light condensing point at the predetermined respective positions.

As described above, it significantly affects the accuracy of the irradiation position with laser light to correctly derive the amount of aberration and design the CGH. Here, for laser light irradiation when the refractive index of the medium is not known, etc., such a method is also conceivable in which the laser light irradiation is first performed to check the light condensing position (e.g., the position of processing) thereof and then provide feedback with the refractive index changed.

The modulation pattern design method executed in step S108 in the flowchart of FIG. 4 will be further described. In the flowchart of FIG. 6, as an example of the design method focusing on an effect by one pixel in a CGH, a design method using an analysis type ORA method is shown. Meanwhile, as a modulation pattern design method, a search type design method such as a hill-climbing method, a simulated annealing method, or a genetic algorithm may be used as described above.

Figure 10:
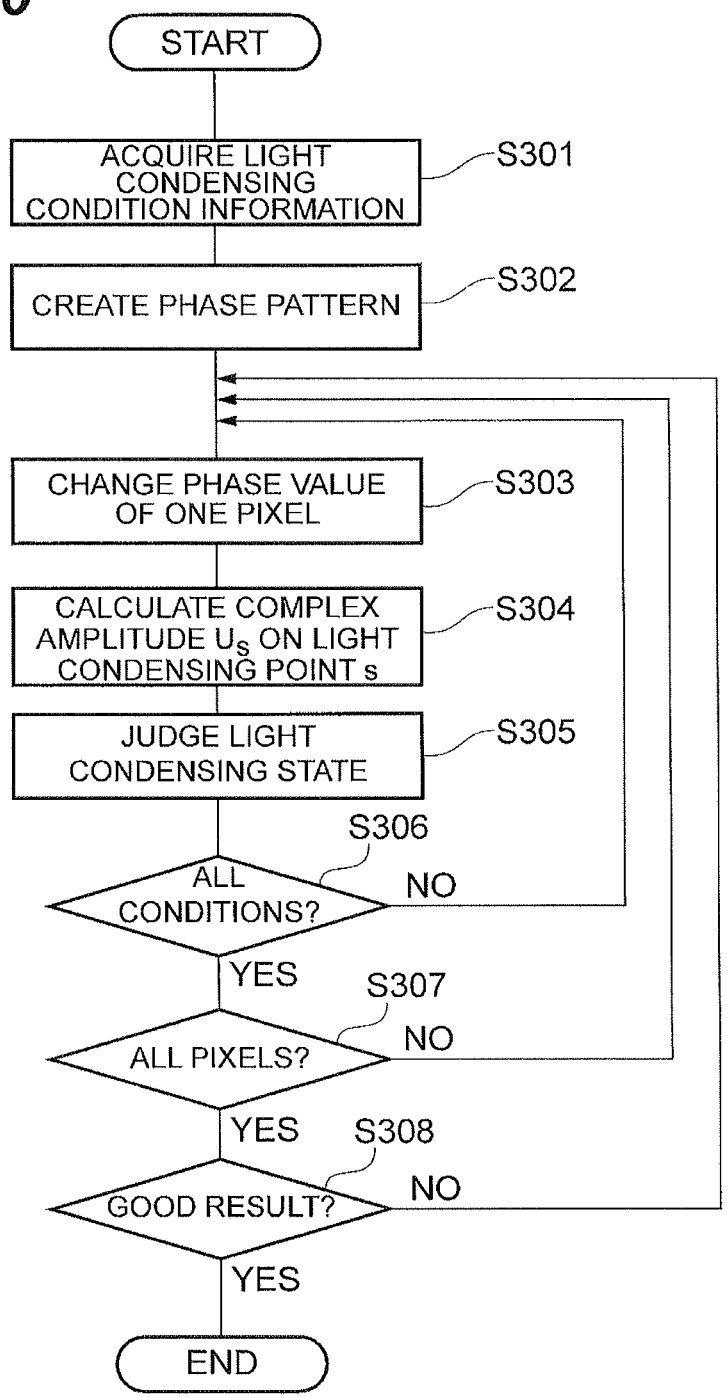
FIG. 10 is a flowchart showing another example of a method for designing a modulation pattern.

FIG. 10 is a flowchart showing another example of a modulation pattern design method executed in the light modulation control device 30 shown in FIG. 3. In this flowchart, a design method in the case where the hill-climbing method is used is shown as an example of a search type design method. In this method, first, information on set light condensing conditions for light condensing irradiation of laser light onto the irradiation object 15 performed via the SLM 20 is acquired, in the same way as in the case of an ORA method (step S301). Next, a phase pattern $\phi_j$ serving as an initial condition for the design of a CGH to be presented in the SLM 20 is created as, for example, a random phase pattern (S302).

Next, a phase value $\phi_j$ changing operation of one pixel in the CGH is performed (S303). Further, the complex amplitude $U_s=A_s\exp(i\phi_s)$ indicating the light condensing state of the laser light at the light condensing point s is calculated using the formula (8) that includes the propagation function $\phi_{js}'$ that takes the aberration condition into account (S304). After calculating a complex amplitude, a judgment of the obtained light condensing state is made (S305).

Here, when the amplitude $A_s$, the intensity $I_s=|A_s|^2$, or the complex amplitude $U_s$ is brought closer to a desired value by switching a phase value $\phi_j$ of one pixel, a phase value at that time is adopted. In the hill-climbing method, for example, a phase value of each pixel in the CGH is switched every $0.1\pi$ (rad) from Off (rad) to a predetermined phase value, for example, switched to $2\pi$ (rad), and a propagation is carried out by use of the formula (8) for every switching. Then, a phase value by which an intensity on the light condensing point s is maximized is determined by a search.

Next, it is judged whether or not switching of a phase value $\phi_j$ of one pixel has been confirmed under all the conditions (S306), and when it has not been confirmed, the process returns to step S303. Moreover, it is judged whether or not the phase value changing operations of one pixel, judging a light condensing state and the like have been performed on all the pixels (S307), and when it has not been performed, the pixel number is set to j=j+1, the process returns to step S303, and a necessary operation is performed on the next pixel.

When the necessary operations have been performed on all the pixels, it is judged whether or not a desired result has been obtained in the design of the CGH (S308). As a judgment method in this case, in the same way as the case of an ORA method, for example, a method of judging by whether or not the values of a light condensing intensity, an amplitude, a complex amplitude, and the like obtained on each light condensing point are within the allowable ranges may be used. Or, in the flowchart of FIG. 10, a method in which it is judged by conditions of, such as, whether or not a specified number of loops of changing a phase value, judging a light condensing state, and the like is performed, may be used. In the case where the necessary conditions are satisfied, the design algorithm for a CGH is completed. In the case where the conditions are not satisfied, the process returns to step S303, to repeat searches from the first pixel.

Here, description is made for the above-described examples of the method for designing a modulation pattern, in all of which the irradiation object 15 is a parallel plane substrate, however, in practice, it is also conceivable that a medium on the propagation path of light such as the object 15 is tilted at an angle of a relative to the optical axis. A large tilt $\alpha$ would cause astigmatism to occur in addition to spherical aberration. In such a case, the tilt $\alpha$ of the object 15 is also determined in addition to the NA of the objective lens, the focal length f, the refractive index $n_1$ of the ambient medium, the refractive index $n_2$ of the irradiation object 15, and the light intensity distribution $I_{j\text{-}in}$ of laser light incident on the SLM.

In the above-described design example, the two-dimensional aberration condition is derived by the analytical technique using the reverse ray tracing, and this is because the spherical aberration is an aberration with axial symmetry. In contrast to this, in the case where, the tilt $\alpha$ of the medium, etc., may cause astigmatism to occur and thus the aberration is not axially symmetric any more, etc., the aberration condition may be derived by an appropriate method corresponding thereto, and then the CGH may be designed using the obtained aberration condition $\phi_{OPD}$.

Further, since laser light is condensed at an arbitrary position as a light condensing point, it is also conceivable that the laser light beam may be condensed at a position different from that of the optical axis. This is not so problematic when the diffraction angle of the beam is small, however, when the angle is large, there will be astigmatism in addition to spherical aberration. In such a case, the tilt $\beta$ of the beam may be determined, as described above, the aberration condition may be derived by an appropriate method corresponding thereto, and then the CGH may be designed using the obtained aberration condition $\phi_{OPD}$.

Concerning a desired light condensing intensity $I_{s\text{-}des}$ of the laser light at each light condensing point s, the CGH may also be designed by taking into account the light transmittance of the material, e.g., of the irradiation object 15 and then by adjusting the intensity $I_{s\text{-}des}$ depending on the irradiation depth, that is, by changing the intensity $I_{s\text{-}des}$ depending on the irradiation depth $z_s$.

Further, since the SLM has a periodic pixel structure, the CGH to be presented on the plurality of pixels provides different intensities of light diffracted by the spatial frequency. Thus, by taking into account such diffraction intensities, the CGH may also be designed by changing the intensity $I_{s\text{-}des}$ depending on the irradiation position $(u_s, v_s)$ and the irradiation depth $z_s$.

It may also be conceivable that there will still be variations in the intensity even when the intensity $I_{s\text{-}des}$ is adjusted as described above. In such a case, the CGH may also be designed by observing the result of irradiation with laser light, for example, a processing result such as the amount of change in refractive index that occurs at an irradiation portion, and then changing the intensity $I_{s\text{-}des}$ by feedback with reference to the observation result thereof.

Further, to process the irradiation object 15 by light condensing irradiation at the light condensing point thereof with laser light, in the foregoing, an example has been shown in which an optical integrated circuit is manufactured by internal processing of glass, however, the material of the processing object 15 in the case of performing laser processing is not limited to a glass medium, but various materials such as a silicon inside, SiC, and the like may serve as objects to be processed, for example.

Further, in the above-described embodiment, description is made mainly assuming the laser processing of the inside of the object 15 by light condensing irradiation for the irradiation object 15 with laser light, however, the above-described laser light irradiation device using the light modulation control device and the method for designing a modulation pattern can be applied to various devices other than laser processing device, for example, laser microscopes such as a laser scanning microscope for cell observation.

Figure 11:
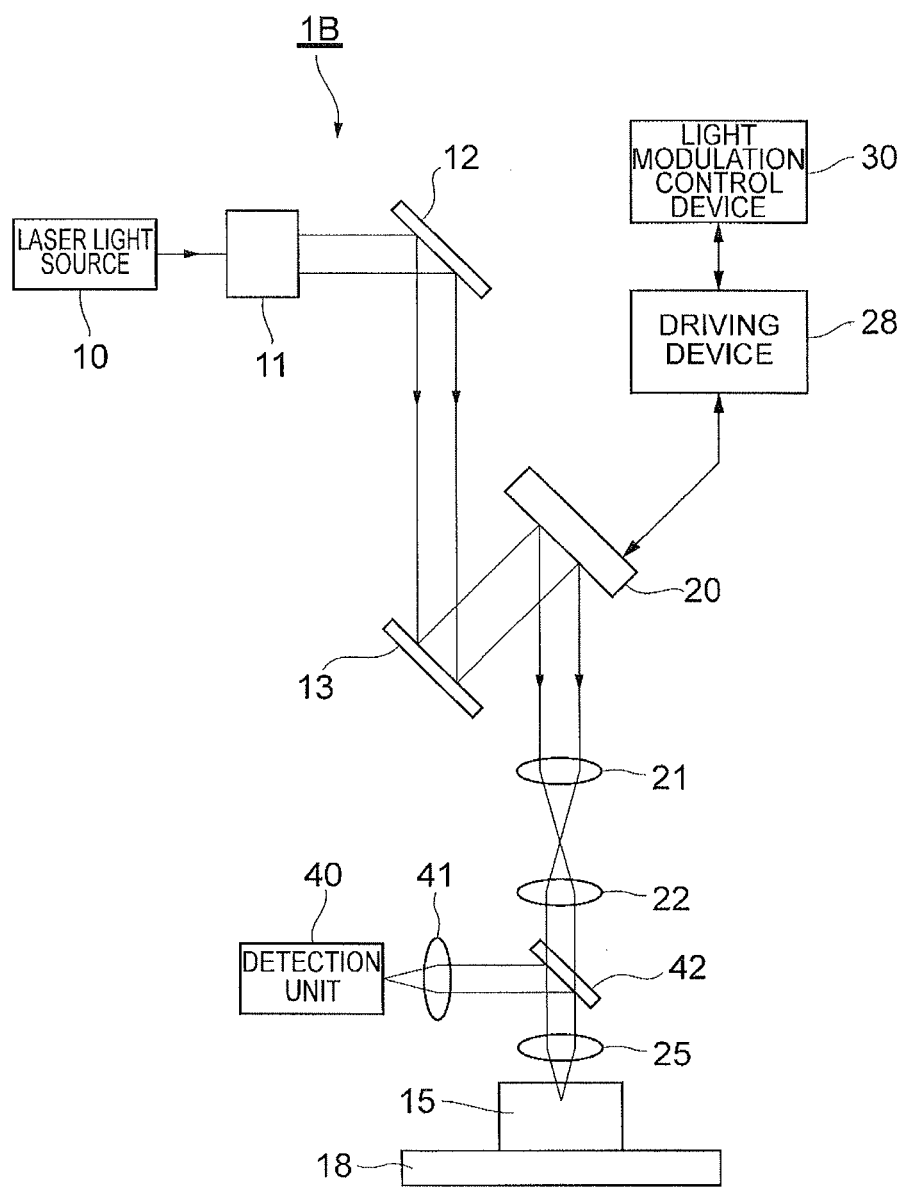
FIG. 11 is a diagram showing a configuration of another embodiment of a laser light irradiation device.

FIG. 11 is a diagram showing a configuration of a laser light irradiation device according to another embodiment including the light modulation control device of the present invention. The laser light irradiation device 1B of the present embodiment is configured in the same manner as the configuration shown in FIG. 1 which includes the laser light source 10, the movable stage 18, the spatial light modulator 20, the driving device 28, and the light modulation control device 30, and in addition thereto, the laser light irradiation device further includes a detection unit 40, a lens 41, and a dichroic mirror 42.

The dichroic mirror 42 is interposed between the lens 22 constituting the 4f optical system and the objective lens 25, in the laser light irradiation optical system. Further, the light from the irradiation object 15 reflected on the dichroic mirror 42 is configured to be incident on the detection unit 40 via the lens 41.

In this manner, the laser light irradiation device 1B of FIG. 11 is configured to be as a laser scanning microscope for irradiating the observation sample 15 of the irradiation object with laser light and then perform observation, by the detection unit 40, for example of the reflected light, scattered light, or fluorescence from the sample 15. Here, the sample 15 is laser-scanned by moving the sample 15 using the movable stage 18 in FIG. 11, however, a movable mechanism, a Galvano mirror, or the like may also be provided on the optical system side.

Figure 12:
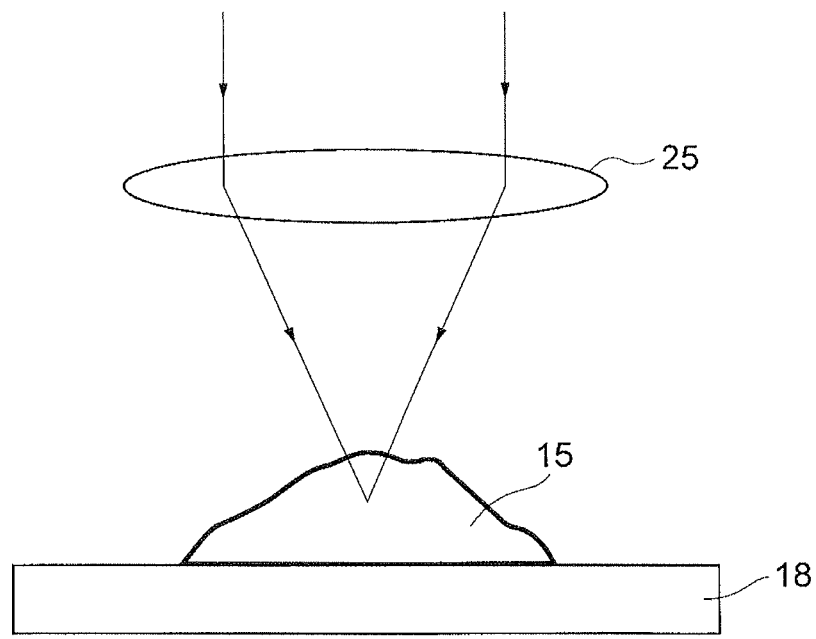
FIG. 12 is a diagram showing an example of the light condensing irradiation onto an irradiation object with laser light.

FIG. 12 is a diagram showing an example of the light condensing irradiation onto the irradiation object (observation sample) 15 with laser light in the laser light irradiation device 1B shown in FIG. 11. For example, in cell observation with the cell as the sample 15, etc., as shown in FIG. 12, it is conceivable that the cell may be observed so as to have different shapes depending on the observation position. In such a case, it is necessary to determine the phase $\phi_{OPD}$ of the aberration condition depending on the respective shapes.

Further, in the laser scanning microscope, there will occur a mismatching of refractive indices not only in the converging process of the laser light but also in the diverging process during observation. In this case, it is also conceivable to derive the aberration condition $\phi_{OPD}$ and design the CGH by taking into account the diverging process, and further correct the reflected light, the scattered light, the fluorescence or the like using another SLM. In this manner, it can be expected to improve the accuracy of sample observation, for example, in a confocal microscope, etc.

Further, in the above-described embodiment, description is made for the embodiment of the phase modulation of laser light of a single wavelength, however, it may also be acceptable to allow a plurality of laser light components to be incident on the SLM from a plurality of light sources of different wavelengths, and then present a modulation pattern in the SLM to modulate the plurality of light components of different wavelengths so as to modulate the respective phases. For example, refer to Non-Patent Document 8 for a method of designing a modulation pattern for modulating a plurality of light components of different wavelengths at the same time.

Description will be now made for a specific case where the configuration of the above-described embodiment is used to control a plurality of wavelengths. In acquiring the information on light condensing conditions, the process acquires the information on the light condensing position of a point s and the wavelength to be condensed. Then, the aberration condition $\phi_{OPD}$ is determined for each point s, and then propagation functions $\phi_{js}$, which differ depending on the wavelength and the position, are converted into $\phi_{js}'$ for use.

The light modulation control method, the control program, the control device, and the laser light irradiation device according to the present invention are not limited to the above-described embodiment and the configuration examples, and various modifications thereof are possible. For example, a configuration of an optical system including a laser light source and a spatial light modulator is not limited to the configuration examples shown in FIG. 1 and FIG. 11, and specifically, various configurations may be used.

Further, concerning the design of the modulation pattern (CGH) to be presented in the spatial light modulator, various specific methods may also be used other than those examples described above. In general, in the design of the modulation pattern, by focusing on an effect by a change in the phase value of the modulation pattern at one pixel on the light condensing state of the laser light at the light condensing point, the phase value may be changed so that the light condensing state is brought closer to a desired state, and then the modulation pattern may be designed by performing such phase value changing operations on all pixels of the modulation pattern, and further, in evaluating the light condensing state at the light condensing point, for the propagation of light from the pixel j in the modulation pattern of the spatial light modulator to the light condensing point s, the aberration condition may be added to the wave propagation function $\phi_{js}$ for free propagation, which is then converted into the propagation function $\phi_{js}'$ for use.

The light modulation control method according to the above-described embodiment is (1) a light modulation control method by use of a phase-modulation type spatial light modulator that inputs laser light thereto and then modulates the phase of the laser light so as to output the phase-modulated laser light and which controls light condensing irradiation of the laser light onto a set light condensing point by a modulation pattern to be presented in the spatial light modulator, and the method includes (2) an irradiation condition acquiring step of acquiring, as an irradiation condition of the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) a light condensing condition setting step of setting, as a light condensing condition of the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) an aberration condition deriving step of deriving an aberration condition that is caused by the first propagation medium and the second propagation medium, which have refractive indices different from each other, in the propagation of the laser light from the spatial light modulator to the light condensing points s; and (5) a modulation pattern designing step of designing the modulation pattern to be presented in the spatial light modulator by taking into account the aberration condition derived in the aberration condition deriving step, and (6) in the modulation pattern designing step, assuming a plurality of two-dimensionally arrayed pixels in the spatial light modulator and focusing on an effect on a light condensing state of the laser light at the light condensing point by a change in a phase value at one pixel of a modulation pattern to be presented in the plurality of pixels, the phase value is changed so that the light condensing state is brought closer to a desired state, and such phase value changing operations are performed on all pixels of the modulation pattern to thereby design the modulation pattern, and to evaluate the light condensing state at the light condensing point, a propagation function $\phi_{js}'$ is employed for the propagation of light from a pixel j of the modulation pattern in the spatial light modulator to the light condensing point s, the propagation function being converted from a wave propagation function for free propagation through a homogeneous propagation medium by adding the aberration condition thereto.

Further, the light modulation control program according to the above-described embodiment is (1) a program allowing a computer to execute light modulation control by use of a phase-modulation type spatial light modulator that inputs laser light thereto and then modulates the phase of the laser light so as to output the phase-modulated laser light and which controls light condensing irradiation of the laser light onto a set light condensing point by a modulation pattern to be presented in the spatial light modulator, and the program allows the computer to execute (2) irradiation condition acquiring processing for acquiring, as an irradiation condition of the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) light condensing condition setting processing for setting, as a light condensing condition of the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) aberration condition deriving processing for deriving an aberration condition that is caused by the first propagation medium and the second propagation medium, which have refractive indices different from each other, in the propagation of the laser light from the spatial light modulator to the light condensing points s; and (5) modulation pattern designing processing for designing the modulation pattern to be presented in the spatial light modulator by taking into account the aberration condition derived in the aberration condition deriving processing, and (6) in the modulation pattern designing processing, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and to evaluate the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

Further, the light modulation control device according to the above-described embodiment is (1) a light modulation control device by use of a phase-modulation type spatial light modulator that inputs laser light thereto and then modulates the phase of the laser light so as to output the phase-modulated laser light and which controls light condensing irradiation of the laser light onto a set light condensing point by a modulation pattern to be presented in the spatial light modulator, and the device includes (2) irradiation condition acquiring means for acquiring, as an irradiation condition of the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index; (3) light condensing condition setting means for setting, as a light condensing condition of the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s; (4) aberration condition deriving means for deriving an aberration condition that is caused by the first propagation medium and the second propagation medium, which have refractive indices different from each other, in the propagation of the laser light from the spatial light modulator to the light condensing points s; and (5) modulation pattern designing means for designing the modulation pattern to be presented in the spatial light modulator by taking into account the aberration condition derived in the aberration condition deriving means, and (6) in the modulation pattern designing means, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and to evaluate the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

Here, in the light modulation control method, the control program, and the control device described above, in deriving the aberration condition, as the aberration condition for the propagation of light from the pixel j to the light condensing point s, it is preferable to determine a phase $\Phi_{j\text{-}OPD}$ which shows an optical path difference during the propagation, and in designing the modulation pattern, determine the propagation function $\phi_{js}'$ that takes the aberration condition into account, by the following conversion formula.

$$\phi_{js}' = \phi_{js} + \Phi_{j\text{-}OPD}$$

According to such a configuration, the propagation function $\phi_{js}$ for free propagation can be preferably converted into the propagation function $\phi_{js}'$ that takes the aberration condition into account.

Further, in the light modulation control method, the control program, and the control device, in designing the modulation pattern, it is preferable to determine a complex amplitude $U_s$ indicating the light condensing state at the light condensing point s by the following formula, $$U_s = A_s \exp(i\phi_s)$$
$$= \Sigma_j A_{j\text{-}in} \exp(i\phi_{js}') \exp(i(\phi_j + \phi_{j\text{-}in}))$$

where $A_{j\text{-}in}$ is the incident amplitude of the laser light on the pixel j of the spatial light modulator, $\phi_{j\text{-}in}$ is the phase, and $\phi_j$ is the phase value at the pixel j. This makes it possible to preferably evaluate the light condensing state of the laser light at the light condensing point.

As a specific configuration in the design of the modulation pattern, in changing the phase value of the pixel j of the modulation pattern, a configuration may be used in which the phase value is changed by a value analytically determined on the basis of the phase $\phi_s$, of the complex amplitude indicating the light condensing state at the light condensing point s, the propagation function $\phi_{js}'$ that takes the aberration condition into account, and the phase value $\phi_j$ before being changed at the pixel j. Such methods for updating the phase value in an analytical manner may include, for example, the ORA (Optimal Rotation Angle) method. Or, in changing the phase value of the pixel j of the modulation pattern, a configuration may be used in which the phase value is changed by a value determined by a search using any method of a hill-climbing method, a simulated annealing method, and a genetic algorithm.

Further, for the first and second propagation media present on the propagation path of the laser light, for example, a configuration may be used in which the second propagation medium is an irradiation object in which the light condensing point is set, and the first propagation medium is an ambient medium present between the spatial light modulator and the irradiation object. Here, the ambient medium may also be water, oil, or the like, other than air or the like. There may also be three or more media between the spatial light modulator and the light condensing point.

Further, the light modulation control device may also include light modulator drive control means providing drive control to the spatial light modulator and presenting, in the spatial light modulator, the modulation pattern designed by the modulation pattern designing means. Further, such light modulator drive control means may also be provided as a separate device other than the light modulation control device for designing the modulation pattern.

The laser light irradiation device according to the above-described embodiment includes (a) a laser light source for supplying laser light; (b) a phase-modulation type spatial light modulator for inputting the laser light thereto, modulating the phase of the laser light, and outputting the modulated laser light after the modulation of the phase; and (c) the light modulation control device, configured as described above, for controlling the light condensing irradiation onto the set light condensing point with the modulated laser light by the modulation pattern to be presented in the spatial light modulator.

Such a configuration allows the light modulation control device to control the light condensing state of the laser light at the light condensing point preferably and reliably, whereby the light condensing irradiation on a single or a plurality of light condensing points set in the irradiation object with the laser light can be preferably achieved, and the operation such as processing and observation of the object can also be thereby preferably achieved. Such a laser light irradiation device can be used, for example, as a laser processing device or a laser microscope. Here, as the spatial light modulator, it is preferable to use a spatial light modulator having a plurality of two-dimensionally arrayed pixels, and modulating the phase of the laser light at the respective ones of the plurality of pixels.

INDUSTRIAL APPLICABILITY

The present invention is applicable as a light modulation control method, a control program, a control device, and a laser light irradiation device which are capable of preferably controlling a light condensing state of laser light at a light condensing point.

REFERENCE SIGNS LIST 1A, 1B—laser light irradiation device, 10—laser light source, 11—beam expander, 12—reflecting mirror, 13—reflecting mirror, 15—irradiation object, 18—movable stage, 20—spatial light modulator, 21—4f optical system lens, 22—4f optical system lens, 25—objective lens, 28—light modulator driving device, 40—detection unit, 41—lens, 42—dichroic mirror, 30—light modulation control device, 31—irradiation condition acquiring unit, 32—light condensing condition setting unit, 33—aberration condition deriving unit, 34—modulation pattern designing unit, 35—light modulator drive control unit, 37—input device, 38—display device.

The invention claimed is:
1. A light modulation control method by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, the light modulation control method comprising:
   an irradiation condition acquiring step of acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index;
   a light condensing condition setting step of setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s;
   an aberration condition deriving step of deriving an aberration condition that is caused by the first propagation medium and the second propagation medium, which have refractive indices different from each other, in the propagation of the laser light from the spatial light modulator to the light condensing point s; and
   a modulation pattern designing step of designing the modulation pattern to be presented in the spatial light modulator by taking into account the aberration condition derived in the aberration condition deriving step, wherein
   in the modulation pattern designing step, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and
   in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

2. The light modulation control method according to claim 1, wherein, as the aberration condition for the propagation of light from the pixel j to the light condensing point s, the aberration condition deriving step determines a phase $\Phi_{j\text{-}OPD}$ which shows an optical path difference during the propagation, and
   the modulation pattern designing step determines the propagation function $\phi_{js}'$ that takes the aberration condition into account by the following conversion formula $$\phi_{js}' = \phi_{js} + \Phi_{j\text{-}OPD}$$

3. The light modulation control method according to claim 1, wherein the modulation pattern designing step determines a complex amplitude $U_s$ indicating the light condensing state at the light condensing point s by the following formula, $$U_s = A_s \exp(i\phi_s)$$
$$= \Sigma_j A_{j\text{-}in} \exp(i\phi'_{js}) \exp(i(\phi_j + \phi_{j\text{-}in}))$$

where $A_{j\text{-}in}$ is the incident amplitude of the laser light on the pixel j of the spatial light modulator, $\phi_{j\text{-}in}$ is the phase, and $\phi_j$ is the phase value at the pixel j.

4. The light modulation control method according to claim 1, wherein, in changing the phase value at the pixel j of the modulation pattern, the modulation pattern designing step changes the phase value by a value analytically determined on the basis of the phase of the complex amplitude indicating the light condensing state at the light condensing point s, the propagation function $\phi_{js}'$ that takes the aberration condition into account, and the phase value $\phi_j$ before being changed at the pixel j.

5. The light modulation control method according to claim 1, wherein, in changing the phase value at the pixel j of the modulation pattern, the modulation pattern designing step changes the phase value by a value determined by a search using any method of a hill-climbing method, a simulated annealing method, and a genetic algorithm.

6. The light modulation control method according to claim 1, wherein the second propagation medium is an irradiation object in which the light condensing point is set, and the first propagation medium is an ambient medium present between the spatial light modulator and the irradiation object.

7. A light modulation control program allowing a computer to execute light modulation control by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, the program allowing the computer to execute:
   irradiation condition acquiring processing for acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index;
   light condensing condition setting processing for setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s;
   aberration condition deriving processing for deriving an aberration condition that is caused by the first propagation medium and the second propagation medium, which have refractive indices different from each other, in the propagation of the laser light from the spatial light modulator to the light condensing point s; and
   modulation pattern designing processing for designing the modulation pattern to be presented in the spatial light modulator by taking into account the aberration condition derived in the aberration condition deriving processing, wherein in the modulation pattern designing processing, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

8. The light modulation control program according to claim 7, wherein, as the aberration condition for the propagation of light from the pixel j to the light condensing point s, the aberration condition deriving processing determines a phase $\Phi_{j\text{-}OPD}$ which shows an optical path difference during the propagation, and the modulation pattern designing processing determines the propagation function $\phi_{js}'$ that takes the aberration condition into account by the following conversion formula $$\phi_{js}' = \phi_{js} + \Phi_{j\text{-}OPD}$$

9. The light modulation control program according to claim 7, wherein the modulation pattern designing processing determines a complex amplitude $U_s$ indicating the light condensing state at the light condensing point s by the following formula, $$U_s = A_s \exp(i\phi_s)$$
$$= \Sigma_j A_{j\text{-}in} \exp(i\phi_{js}') \exp(i(\phi_j + \phi_{j\text{-}in}))$$

where $A_{j\text{-}in}$ is the incident amplitude of the laser light on the pixel j of the spatial light modulator, $\phi_{j\text{-}in}$ is the phase, and $\phi_j$ is the phase value at the pixel j.

10. The light modulation control program according to claim 7, wherein, in changing the phase value at the pixel j of the modulation pattern, the modulation pattern designing processing changes the phase value by a value analytically determined on the basis of the phase $\phi_s$ of the complex amplitude indicating the light condensing state at the light condensing point s, the propagation function $\phi_{js}'$ that takes the aberration condition into account, and the phase value $\phi_j$ before being changed at the pixel j.

11. The light modulation control program according to claim 7, wherein, in changing the phase value at the pixel j of the modulation pattern, the modulation pattern designing processing changes the phase value by a value determined by a search using any method of a hill-climbing method, a simulated annealing method, and a genetic algorithm.

12. The light modulation control program according to claim 7, wherein the second propagation medium is an irradiation object in which the light condensing point is set, and the first propagation medium is an ambient medium present between the spatial light modulator and the irradiation object.

13. A light modulation control device by use of a phase-modulation type spatial light modulator that inputs laser light thereto and then modulates the phase of the laser light so as to output the phase-modulated laser light and which controls light condensing irradiation onto a set light condensing point with the laser light by a modulation pattern to be presented in the spatial light modulator, the light modulation control device comprising:

irradiation condition acquiring means acquiring, as an irradiation condition for the laser light, an incident pattern of the laser light to the spatial light modulator, a first refractive index $n_1$ of a first propagation medium on a propagation path of the laser light from the spatial light modulator to the light condensing point, and a second refractive index $n_2$ of a second propagation medium located to be closer to the light condensing point side than the first propagation medium, the second refractive index being different from the first refractive index;

light condensing condition setting means setting, as a light condensing condition for the laser light, the number $s_t$ of the light condensing points for light condensing irradiation with the laser light from the spatial light modulator ($s_t$ is an integer of 1 or more), and the light condensing position and the light condensing intensity of each of the $s_t$ light condensing points s;

aberration condition deriving means deriving an aberration condition that is caused by the first propagation medium and the second propagation medium, which have refractive indices different from each other, in the propagation of the laser light from the spatial light modulator to the light condensing point s; and modulation pattern designing means designing the modulation pattern to be presented in the spatial light modulator by taking into account the aberration condition derived in the aberration condition deriving means, wherein in the modulation pattern designing means, assuming a plurality of two-dimensionally arrayed pixels in the spatial light modulator and focusing on an effect on a light condensing state of the laser light at the light condensing point by a change in a phase value at one pixel of the modulation pattern to be presented in the plurality of pixels, the phase value is changed so that the light condensing state is brought closer to a desired state, and such phase value changing operations are performed on all pixels of the modulation pattern to thereby design the modulation pattern, and in evaluating the light condensing state at the light condensing point, a propagation function $\phi_{js}'$ is employed for the propagation of light from a pixel j of the modulation pattern in the spatial light modulator to the light condensing point s, the propagation function being converted from a wave propagation function $\phi_{js}$ for free propagation through a homogeneous propagation medium by adding the aberration condition thereto.

14. The light modulation control device according to claim 13, wherein, as the aberration condition for the propagation of light from the pixel j to the light condensing point s, the aberration condition deriving means determines a phase $\Phi_{j\text{-}OPD}$ which shows an optical path difference during the propagation, and the modulation pattern designing means determines the propagation function $\phi_{js}'$ that takes the aberration condition into account by the following conversion formula $$\phi_{js}' = \phi_{js} + \Phi_{j\text{-}OPD}$$

15. The light modulation control device according to claim 13, wherein the modulation pattern designing means determines a complex amplitude $U_s$ indicating the light condensing state at the light condensing point s by the following formula, $$U_s = A_s \exp(i\phi_s)$$
$$= \Sigma_j A_{j\text{-}in} \exp(i\phi'_{js}) \exp(i(\phi_j + \phi_{j\text{-}in}))$$

where $A_{j\text{-}in}$ is the incident amplitude of the laser light on the pixel j of the spatial light modulator, $\phi_{j\text{-}in}$ is the phase, and $\phi_j$ is the phase value at the pixel j.

16. The light modulation control device according to claim 13, wherein, in changing the phase value at the pixel j of the modulation pattern, the modulation pattern designing means changes the phase value by a value analytically determined on the basis of the phase $\phi_s$ of the complex amplitude indicating the light condensing state at the light condensing point s, the propagation function $\phi_{js}'$ that takes the aberration condition into account, and the phase value $\phi_j$ before being changed at the pixel j.

17. The light modulation control device according to claim 13, wherein, in changing the phase value at the pixel j of the modulation pattern, the modulation pattern designing means changes the phase value by a value determined by a search using any method of a hill-climbing method, a simulated annealing method, and a genetic algorithm.

18. The light modulation control device according to claim 13, wherein the second propagation medium is an irradiation object in which the light condensing point is set, and the first propagation medium is an ambient medium present between the spatial light modulator and the irradiation object.

19. The light modulation control device according to claim 13, further comprising:
light modulator drive control means providing drive control to the spatial light modulator and presenting, in the spatial light modulator, the modulation pattern designed by the modulation pattern designing means.

20. A laser light irradiation device comprising:
a laser light source supplying laser light;
a phase-modulation type spatial light modulator inputting the laser light thereto, modulating the phase of the laser light, and outputting the phase-modulated laser light; and
the light modulation control device according to claim 13 controlling the light condensing irradiation onto the set light condensing point with the laser light by the modulation pattern to be presented in the spatial light modulator.

* * * * *